(12) United States Patent
Okuwaki et al.

(10) Patent No.: US 12,389,108 B2
(45) Date of Patent: Aug. 12, 2025

(54) ELECTRONIC EQUIPMENT, METHOD FOR CONTROLLING THE SAME, AND RECORDING MEDIUM

(71) Applicant: CANON KABUSHIKI KAISHA, Tokyo (JP)

(72) Inventors: Maiki Okuwaki, Tokyo (JP); Hiroyuki Kajiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/420,106

(22) Filed: Jan. 23, 2024

(65) Prior Publication Data
US 2024/0205534 A1 Jun. 20, 2024

Related U.S. Application Data

(63) Continuation of application No. 17/824,361, filed on May 25, 2022, now Pat. No. 11,949,977.

(30) Foreign Application Priority Data

May 31, 2021 (JP) .................. 2021-091344

(51) Int. Cl.
| | | |
|---|---|---|
| H04N 23/60 | (2023.01) | |
| H04N 13/207 | (2018.01) | |
| H04N 23/63 | (2023.01) | |
| H04N 23/69 | (2023.01) | |
| H04N 23/698 | (2023.01) | |

(52) U.S. Cl.
CPC ......... *H04N 23/632* (2023.01); *H04N 13/207* (2018.05); *H04N 23/635* (2023.01); *H04N 23/69* (2023.01); *H04N 23/698* (2023.01)

(58) Field of Classification Search
CPC .. H04N 13/207; H04N 13/218; H04N 13/296; H04N 23/60; H04N 23/62; H04N 23/631; H04N 23/632; H04N 23/635; H04N 23/69; H04N 23/698
USPC .......................................................... 348/49
See application file for complete search history.

(56) References Cited

U.S. PATENT DOCUMENTS

| | | | |
|---|---|---|---|
| 11,949,977 B2 * | 4/2024 | Okuwaki | ............... H04N 23/62 |
| 2012/0026300 A1 * | 2/2012 | Kakiuchi | ............. H04N 13/218 |
| | | | 348/E13.074 |
| 2018/0106986 A1 * | 4/2018 | Xu | ......................... G02B 7/021 |

(Continued)

FOREIGN PATENT DOCUMENTS

| | | |
|---|---|---|
| CN | 1534991 A | 10/2004 |
| CN | 103842907 A | 6/2014 |
| CN | 105282534 A | 1/2016 |

(Continued)

*Primary Examiner* — Behrooz M Senfi
(74) *Attorney, Agent, or Firm* — Canon U.S.A., Inc. IP Division

(57) ABSTRACT

Electronic equipment includes an obtaining unit configured to obtain a third image in which a first image captured via a first optical system and a second image captured via a second optical system are arranged side by side, the second image having parallax with the first image and a setting unit configured to set, in the third image, a target area to which predetermined processing is to be applied, based on a user operation. The setting unit is configured to set the target area in such a manner that the item indicating the target area includes either one of the first image and the second image.

18 Claims, 11 Drawing Sheets

(56) References Cited

U.S. PATENT DOCUMENTS

2022/0385828 A1* 12/2022 Okuwaki ............. H04N 23/635
2024/0236503 A1* 7/2024 Shoji .................... H04N 23/634

FOREIGN PATENT DOCUMENTS

| JP | 2001320733 A | 11/2001 |
| --- | --- | --- |
| JP | 2006013609 A | 1/2006 |
| JP | 2010103949 A | 5/2010 |
| JP | 2010177921 A | 8/2010 |
| JP | 2020039135 A | 3/2020 |
| WO | 2013046886 A1 | 4/2013 |

* cited by examiner

ELECTRONIC EQUIPMENT, METHOD FOR CONTROLLING THE SAME, AND RECORDING MEDIUM

CROSS-REFERENCE TO RELATED APPLICATIONS

The present application is a continuation of U.S. patent application Ser. No. 17/824,361, filed on May 25, 2022, which claims priority from Japanese Patent Application No. 2021-091344 filed May 31, 2021, which are hereby incorporated by reference herein in their entireties.

BACKGROUND OF THE INVENTION

Field of the Invention

The present invention relates to electronic equipment, a method for controlling the same, and a recording medium.

Description of the Related Art

Digital cameras having two lens optical systems have been known in recent years. With a digital camera having two lens optical systems disposed to capture images in the same direction, a 180-degree angle image (hemispherical image) or a stereoscopic view image can be generated from two images, having parallax, obtained by the respective optical systems. With a digital camera having two optical systems disposed to capture images in opposite directions, a 360-degree angle image (spherical image) can be generated from two images obtained by the respective optical systems.

In image capturing of two images having parallax by using such a digital camera including two optical systems, the user observes two live view images during the image capturing. With a normal digital camera having one optical system, the user enlarge one live view image and display the one enlarged image for detailed observation.

Japanese Patent Application Laid-Open No. 2013-201527 discusses a digital camera, having one optical system, capable of separately setting a position of a zoom frame and a position of an automatic focus (AF) frame within a live view image. In a case where a user issues a zoom instruction, the live view image is enlarged at the position where the zoom frame is displayed on the live view image. Japanese Patent Application Laid-Open No. 2019-12881 discusses displaying a spherical image obtained via two optical systems, and in response to an imaging preparation instruction from the user, enlarging a live view image in a specific zoom target area and displaying the enlarged image.

However, Japanese Patent Application Laid-Open No. 2013-201527 does not include a detailed discussion of a case of displaying two live view images, and consequently there is not a detailed discussion on which of the live view images displays the zoom frame and which of the live view images is enlarged. According to Japanese Patent Application Laid-Open No. 2019-12881, the zoom target area, i.e., which part of a fisheye image is to be enlarged is unknown until the user issues the imaging preparation instruction.

The present invention is directed to enabling the user to visually observe a zoom target position in a state where a plurality of live view images obtained via a plurality of optical systems is displayed.

SUMMARY OF THE INVENTION

According to an aspect of the present invention, electronic equipment includes an obtaining unit configured to obtain a third image in which a first image captured via a first optical system and a second image captured via a second optical system are arranged side by side, the second image having parallax with the first image, a setting unit configured to set, in the third image, a target area to which predetermined processing is to be applied, based on a user operation, a first receiving unit configured to receive a position designation for a position of an item indicating the target area, a second receiving unit configured to receive a zoom instruction for enlarging the target area, and a display control unit configured to display the third image and the item on a display unit, wherein the setting unit is configured to set the target area in such a manner that the item indicating the target area includes either one of the first image and the second image, change, in response to the position designation performed by a user, a position of the item to a designated position, and control, in a case where the zoom instruction is issued by the user, enlarging of the third image based on the target area indicated by the item.

Further features of the present invention will become apparent from the following description of exemplary embodiments with reference to the attached drawings.

DESCRIPTION OF THE EMBODIMENTS

Exemplary embodiments of the present invention will be described below with reference to the drawings. An exemplary embodiment will initially be described by using a case where the electronic equipment is a digital camera (imaging apparatus) as an example.

A digital camera 100 according to the present exemplary embodiment can capture a dual-lens image and display the dual-lens image on a display unit. The dual-lens image is an image having a left image and a right image arranged side by side and having lateral parallax between the left image and the right image. The digital camera 100 can apply predetermined image processing to a target area of the image displayed on the display unit. An example of the predetermined image processing is zoom processing. In the following description, a case of the zoom processing will be described in detail. The digital camera 100 displays an enlarged image, which is obtained by enlarging the target area in response to a zoom instruction, on the display unit. The predetermined image processing is not limited to the zoom processing. Examples of the predetermined image processing may include processing for detecting a luminance distribution or chromaticity distribution in the target area and generating a histogram or a waveform monitor, and processing for applying filter processing, such as contrast enhancement processing to the target area. In the present exemplary embodiment, the zoom instruction is issued by a pressing operation performed on a zoom button 78 serving as a physical member that can be pressed down. However, the zoom instruction may be issued by a pinch-out operation performed on a touch panel 70a. An enlarged display may be cancelled by a pinch-in operation.

The digital camera 100 according to the present exemplary embodiment adapts an item indicating the target area to a dual-lens image to display the item on the dual-lens image. Examples of the item include a frame-shape indicator indicating the target area and a semitransparent color image superimposed on the target area. The digital camera 100 can change a display position of the item (i.e., the target area indicated by the item) based on user operations. In a case where a dual-lens image is displayed, the digital camera 100 displays the item at a position where the target area of the item does not extend over both the left and right images. That is, the target area is determined to not include both the left and right images. In other words, the target area is set to include one of the left and right images.

The digital camera 100 controls display of the item in such a manner that the target area indicated by the item does not extend over both the left and right images even if a user operation to change the display position of the item (position of the target area) is performed.

Figure 1A:
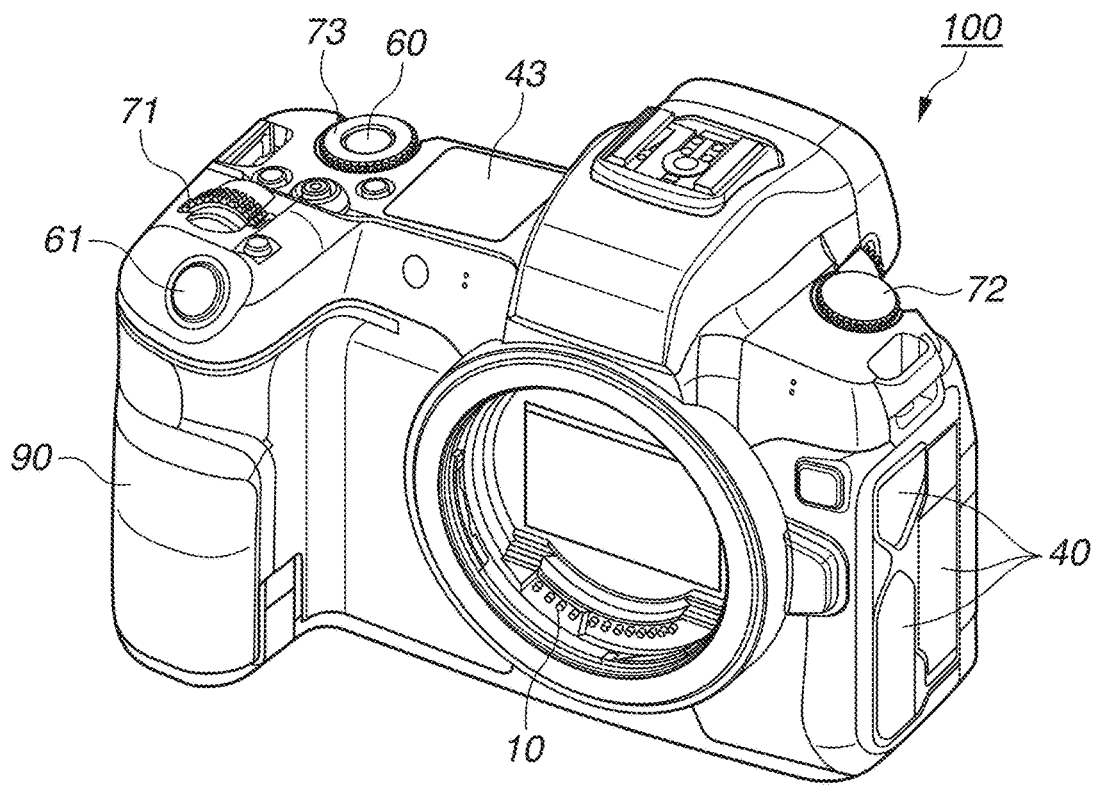
FIGS. 1A and 1B are external views illustrating a digital camera.
Figure 1B:
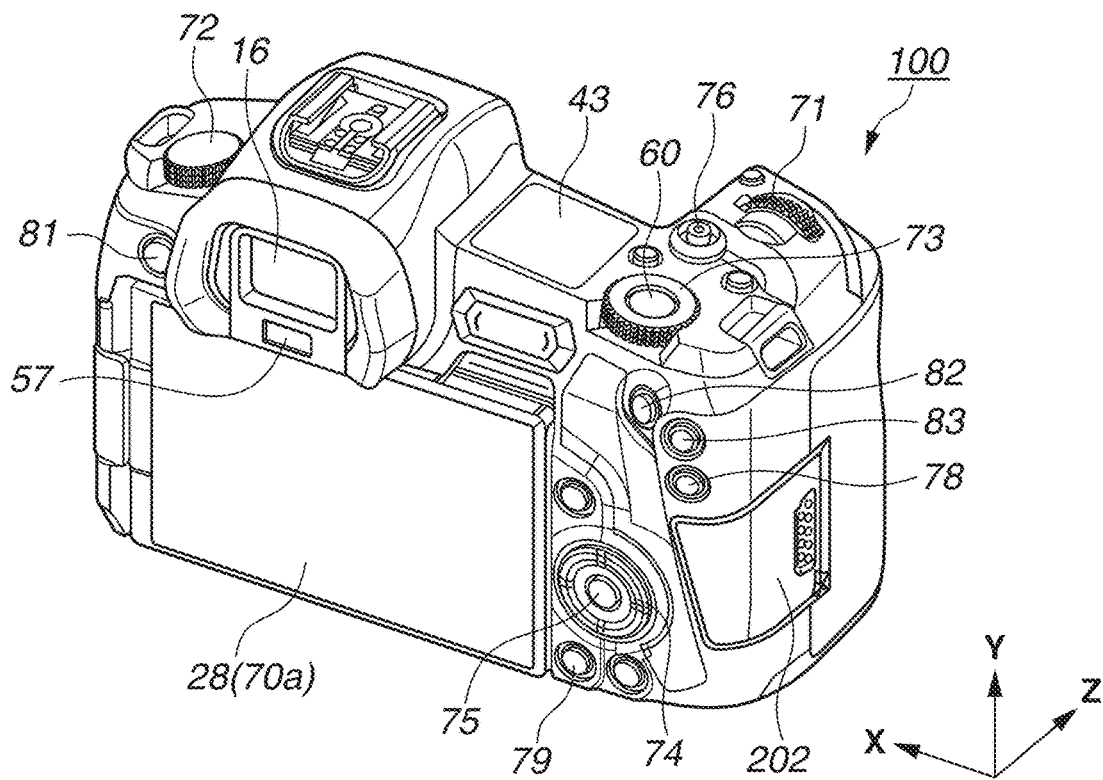

FIGS. 1A and 1B illustrate external views of the digital camera 100 that is an example of an apparatus to which the present exemplary embodiment can be applied. FIG. 1A is a front perspective view of the digital camera 100. FIG. 1B is a rear perspective view of the digital camera 100. As illustrated in FIG. 1B, a display unit 28 for displaying images and various types of information is disposed at the rear of the digital camera 100. A touch panel 70a is a touch detection unit that can detect a touch operation performed on the display surface (operation surface) of the display unit 28. An external-viewfinder display unit 43 is a display unit disposed on the top of the digital camera 100. The external-viewfinder display unit 43 displays various setting values of the digital camera 100, including a shutter speed and an aperture value. The display unit 28 may be built into the digital camera 100 or detachably attached to the digital camera 100. Also, the display unit 28 may be an external device connected to a communication unit 54 of the digital camera 100.

A shutter button 61 is an operation unit for receiving an imaging instruction. A mode change switch 60 is an operation unit for switching various modes. Terminal covers 40 are covers that protect connection cable connectors (not illustrated) for connecting connection cables of external devices with the digital camera 100. A main electronic dial 71 included in an operation unit 70 is a rotary operation member. Setting values, such as the shutter speed and the aperture value, can be changed by rotating the main electronic dial 71. A power switch 72 is an operation member for powering the digital camera 100 on and off.

A sub electronic dial 73 included in the operation unit 70 is a rotary operation member for moving a selection frame and scrolling images. A directional pad 74 included in the operation unit 70 is a directional pad (four-way directional pad) capable of being pressed up, down, left, and right portions individually. The digital camera 100 can perform operations based on the pressed portion of the directional pad 74. A set button 75 included in the operation unit 70 is a push button for mainly receiving confirmation of a selected item. A moving image button 76 is a button for receiving instructions to start and stop moving image capturing (recording).

The zoom button 78 included in the operation unit 70 is an operation button for turning on and off a zoom mode during a live view display in an imaging mode. In a case where the zoom mode is on, a live view (LV) image can be zoomed in and out by an operation performed on the main electronic dial 71. In a playback mode, the zoom button 78 functions as a zoom button for zooming in a reproduced image and increasing the zoom ratio. A playback button 79 included in the operation unit 70 is an operation button for switching between the imaging mode and the playback mode. In a case where the playback button 79 is pressed in the imaging mode, the digital camera 100 can enter the playback mode and display the latest image among the images recorded on a recording medium 200 on the display unit 28.

A menu button 81 is included in the operation unit 70. In a case where the menu button 81 is pressed, a menu screen on which various settings can be set is displayed on the display unit 28. The user can intuitively perform various settings on the menu screen displayed on the display unit 28 by using the directional pad 74 and the set button 75.

A multi-controller 82 can be tilted in 360-degree directions to receive key instructions each corresponding to different one of eight directions, such as up, down, left, and right directions. The multi-controller 82 can also be pressed to trigger an assigned function. A display mode switch button 83 is an operation member for switching between a plurality of different display modes related to an LV image and information, such as imaging information, displayed on the display unit 28 or an electronic viewfinder (EVF) 29. The display modes are switched each time the display mode switch button 83 is pressed, whereby an image can be captured and information about a reproduced image can be visually observed in the user-desired display mode.

A communication terminal 10 is a communication terminal for the digital camera 100 to communicate with a lens unit (detachably attachable).

An eyepiece unit 16 is an eyepiece portion of an eyepiece viewfinder (look-through viewfinder; hereinafter, referred to simply as a viewfinder). The user can visually observe a video image displayed on the EVF 29 provided inside through the eyepiece unit 16. An eye proximity detection unit 57 is an eye proximity detection sensor for detecting whether the user's eye is put up to the eyepiece unit 16. A lid 202 is a lid of a slot accommodating the recording medium 200. A grip portion 90 is a holding portion having a shape easy for the user holding the digital camera 100 to grip by the right hand. The shutter button 61 and the main electronic dial 71 are disposed at positions operable with the right index finger in a state where the digital camera 100 is held with the grip portion 90 gripped with the right little finger, ring finger, and middle finger. The sub electronic dial 73 is disposed at a position operable with the right thumb in the same state.

Figure 2:
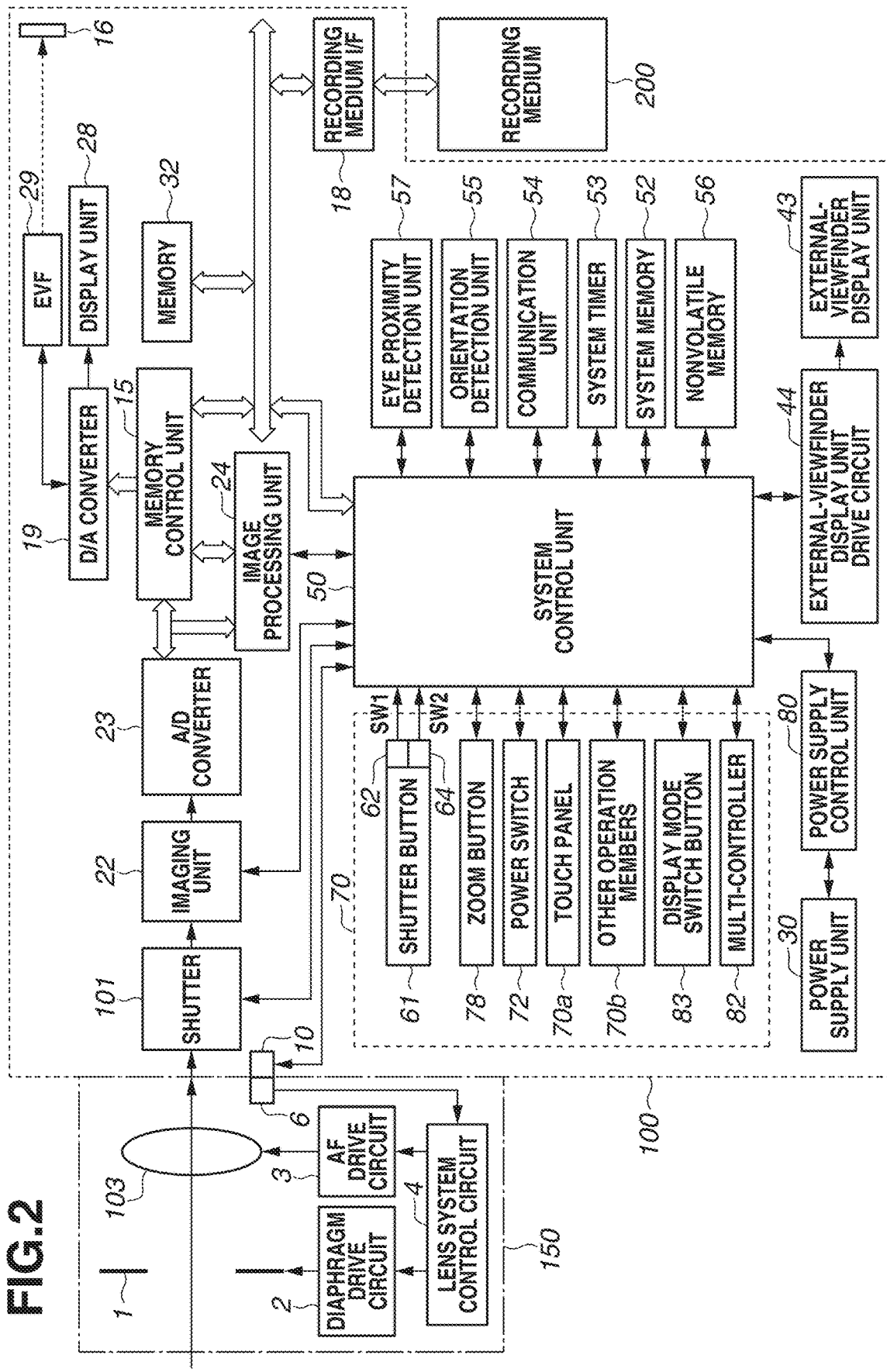
FIG. 2 is a schematic block diagram illustrating a hardware configuration example of the digital camera.

FIG. 2 is a block diagram illustrating a configuration example of the digital camera 100 according to the present exemplary embodiment. In FIG. 2, a lens unit 150 is an interchangeable lens unit including an imaging lens. A lens 103 usually consists of a plurality of lenses but is illustrated as a single lens here for the sake of simplicity. A communication terminal 6 is a communication terminal of the lens unit 150 to communicate with the digital camera 100. The communication terminal 10 is the communication terminal of the digital camera 100 to communicate with the lens unit 150. The lens unit 150 communicates with a system control unit 50 via the communication terminals 6 and 10. A lens system control circuit 4 in the lens unit 150 controls a diaphragm 1 via a diaphragm drive circuit 2, and adjust the focus by displacing the lens 103 via an automatic focus (AF) drive circuit 3. Moreover, the system control unit 50 identifies the type of lens unit 150 attached to the digital camera 100 via the communication terminals 6 and 10.

A shutter 101 is a focal plane shutter that can freely control exposure time of an imaging unit 22 under control of the system control unit 50.

The imaging unit 22 is an image sensor including a charge-coupled device (CCD) sensor or a complementary metal-oxide-semiconductor (CMOS) sensor for converting an optical image into an electrical signal. The imaging unit 22 may include an image plane phase difference sensor that outputs defocus amount information to the system control unit 50. An analog-to-digital (A/D) converter 23 converts an analog signal into a digital signal. The A/D converter 23 is used to covert an analog signal output from the imaging unit 22 into a digital signal.

An image processing unit 24 performs predetermined resize processing, such as pixel interpolation and reduction, and color conversion processing on data from the A/D converter 23 or data from a memory control unit 15. The image processing unit 24 also performs predetermined calculation processing using captured image data. The system control unit 50 performs exposure control and ranging control based on the calculation result obtained by the image processing unit 24. Based on the controls, through-the-lens (TTL) AF processing, automatic exposure (AE) control, and electronic flash (EF) (preliminary flash emission) processing are performed. The image processing unit 24 further performs predetermined calculation processing using the captured image data, and performs TTL automatic white balance (AWB) processing based on the calculation result obtained by the image processing unit 24.

Data output from the A/D converter 23 is written to a memory 32 via the image processing unit 24 and the memory control unit 15, or directly via the memory control unit 15. The memory 32 stores image data that is obtained by the imaging unit 22 and digitally converted by the A/D converter 23, and image data to be displayed on the display unit 28 and the EVF 29. The memory 32 has a sufficient storage capacity to store a predetermined number of still images or a predetermined duration of moving image and audio data.

The memory 32 also serves as an image display memory (video memory). A digital-to-analog (D/A) converter 19 converts image display data stored in the memory 32 into an analog signal and supplies the analog signal to the display unit 28 and the EVF 29. The image display data written to the memory 32 is thus displayed on the display unit 28 and the EVF 29 via the D/A converter 19. The display unit 28 and the EVF 29 perform display based on the analog signal from the D/A converter 19 on respective display devices, which are a liquid crystal display (LCD) and an organic electroluminescence (EL) display, for example. An LV display can be provided by converting digital signals, which have been once A/D-converted by the A/D converter 23 and stored in the memory 32, into analog signals by the D/A converter 19 and successively transferring the analog signals to the display unit 28 or the EVF 29. The image displayed by the LV display will hereinafter be referred to as an LV image.

Various setting values of the digital camera 100, including the shutter speed and the aperture value, are displayed on the external-viewfinder display unit 43 via an external-viewfinder display unit drive circuit 44.

A nonvolatile memory 56 is an electrically erasable and recordable memory. For example, an electrically erasable programmable read-only memory (EEPROM) is used as the nonvolatile memory 56. The nonvolatile memory 56 stores operating constants of the system control unit 50 and programs. As employed herein, the programs refer to ones for executing various processing procedures of flowcharts to be described below in the present exemplary embodiment.

The system control unit 50 is a control unit including at least one processor or circuit, and perform entire control of the digital camera 100. The system control unit 50 implements various processes according to the present exemplary embodiment to be described below by executing the foregoing programs recorded in the nonvolatile memory 56. A system memory 52 is a random access memory (RAM), for example. The operating constants of the system control unit 50, variables, and the programs read from the nonvolatile memory 56 are loaded into the system memory 52. Moreover, the system control unit 50 performs display control by controlling the memory 32, the D/A converter 19, and the display unit 28.

A system timer 53 is a clocking unit that measures time to be used for various types of control and the time of a built-in clock.

The operation unit 70 is operation means for inputting various operation instructions into the system control unit 50.

The mode change switch 60 included in the operation unit 70 is an operation member for switching the operation mode of the system control unit 50 to any one of a still image capturing mode, a moving image capturing mode, and the playback mode. The still image capturing mode includes the following modes: an automatic imaging mode, an automatic scene determination mode, a manual mode, an aperture priority mode (aperture value (Av) mode), a shutter speed priority mode (time value (Tv) mode), and a program AE mode (P mode). The still image capturing mode also includes various scene modes that have imaging settings specific to respective imaging scenes, as well as a custom mode. The user can switch directly to one of the modes using the mode change switch 60. Alternatively, the user may once switch to an imaging mode list screen by using the mode change switch 60, and then select one of a plurality of modes displayed and switch to the selected mode using another operation member. The moving image capturing mode may similarly include a plurality of modes.

A first shutter switch 62 turns on to generate a first shutter switch signal SW1 when the shutter button 61 on the digital camera 100 is operated halfway, i.e., half-pressed (imaging preparation instruction). In response to the first shutter switch signal SW1, imaging preparation operations, such as the AF processing, the AE processing, the AWB processing, and the EF processing are started.

A second shutter switch 64 turns on to generate a second shutter switch signal SW2 when the shutter button 61 is completely operated, i.e., fully pressed (imaging instruction). In response to the second shutter switch signal SW2, the system control unit 50 starts a series of imaging processing operations from reading of a signal from the imaging unit 22 to writing of a captured image to the recording medium 200 as an image file.

The operation unit 70 serves as various operation members (receiving units) serving as input units for receiving operations from the user. The operation unit 70 includes at least the following operation members: the mode change switch 60, the shutter button 61, the main electronic dial 71, the power switch 72, the sub electronic dial 73, the directional pad 74, the set button 75, the moving image button 76, the zoom button 78, the playback button 79, the menu button 81, and the multi-controller 82. These operation members are collectively illustrated as operation members 70b instead of individual blocks.

A power supply control unit 80 includes a battery detection circuit, a direct-current-to-direct-current (DC-DC) converter, and a switch circuit for switching blocks to be energized, and detects presence or absence of a battery attached, the type of battery, and a remaining battery level. The power supply control unit 80 also controls the DC-DC converter based on the detection results and instructions from the system control unit 50, and supplies predetermined voltages to various components, including the recording medium 200, for predetermined periods. A power supply unit 30 includes a primary battery, such as an alkali battery and a lithium battery, a secondary battery, such as a nickel-cadmium (NiCd) battery, a nickel-metal halide (NiMH) battery, and a lithium-ion (Li) battery, and/or an alternating-current (AC) adaptor.

A recording medium interface (I/F) 18 is an I/F with the recording medium 200, such as a memory card and a hard disk. The recording medium 200 is a recording medium for recording captured images, and includes a semiconductor memory or a magnetic disk.

A communication unit 54 performs a wireless connection or a wired connection, and transmits and receives video and audio signals. The communication unit 54 can also connect to a wireless local area network (LAN) and the Internet. The communication unit 54 can also communicate with external equipment using Bluetooth® and Bluetooth® Low Energy. The communication unit 54 can transmit images captured by the imaging unit 22 (including the LV image) and images recorded on the recording medium 200, and receive images and various types of other information from external equipment.

An orientation detection unit 55 detects the orientation of the digital camera 100 with respect to the direction of gravity. Determination of whether an image captured by the imaging unit 22 is an image captured with the digital camera 100 held landscape or portrait can be performed based on an orientation detected by the orientation detection unit 55. The system control unit 50 can add orientation information based on the orientation detected by the orientation detection unit 55 to the image file of the image captured by the imaging unit 22, or rotate the image and record the rotated image. An acceleration sensor or a gyro sensor can be used as the orientation detection unit 55. Motion of the digital camera 100 (such as a pan, tilt, lift-up, and whether the digital camera 100 is stationary) can also be detected using the acceleration sensor or gyro sensor that is the orientation detection unit 55.

The eye proximity detection unit 57 is an eye proximity detection sensor that detects an approach (eye proximity) and withdrawal (eye separation) of an eye (object) to/from the eyepiece unit 16 of the viewfinder (proximity detection). The system control unit 50 switches display (display state) and non-display (non-display state) of the display unit 28 and the EVF 29 based on a state detected by the eye proximity detection unit 57. More specifically, in a case where the digital camera 100 is at least in an imaging standby state and the display destination switching is set to automatic switching, the system control unit 50 turns on the display unit 28 as a display destination and turns off the EVF 29 during a non-eye proximity state. The system control unit 50 turns on the EVF 29 as a display destination and turns off the display unit 28 during an eye proximity state.

For example, an infrared proximity sensor can be used as the eye proximity detection unit 57, and can detect an approach of an object to the eyepiece unit 16 of the viewfinder including the EVF 29. In a case where an object approaches, infrared rays emitted from a light emitting portion (not illustrated) of the eye proximity detection unit 57 are reflected by the object and received by a light receiving portion (not illustrated) of the infrared proximity sensor. Determination of how close the object is to the eyepiece unit 16 (eye proximity distance) can also be performed based on the amount of infrared rays received. The eye proximity detection unit 57 can thus perform eye proximity detection to detect a proximity distance of the object to the eyepiece unit 16.

In a case where an object approaching the eyepiece unit 16 less than or equal to a predetermined distance is detected in a non-eye proximity state (non-approach state), eye proximity is detected. In a case where the object having been detected to be in proximity in an eye proximity state (approach state) moves away more than or equal to a predetermined distance from the eyepiece unit 16, eye separation is detected. The threshold for detecting eye proximity and the threshold for detecting eye separation may be different. For example, the two thresholds may have hysteresis. After detection of eye proximity, the eye proximity state continues until eye separation is detected. After detection of eye separation, the non-eye proximity state continues until eye proximity is detected. The infrared proximity sensor is just an example. Other sensors that can detect an approach of an eye or object that can be detected for the eye proximity determination may be employed as the eye proximity detection unit 57.

The touch panel 70a and the display unit 28 may be integrally configured. For example, the touch panel 70a is configured so that its light transmittance does not interfere with display on the display unit 28, and attached onto the display surface of the display unit 28. Input coordinates of the touch panel 70a are associated with display coordinates on a display screen of the display unit 28. This can provide a graphical user interface (GUI) that enables the user to perform operations as if the user directly operates the screen displayed on the display unit 28. The system control unit 50 can detect the following operations or states of the touch panel 70a.

A finger or a pen not touching the touch panel 70a newly touches on the touch panel 70a. In other words, a touch is started (hereinafter, referred to as a touch-down).

A finger or a pen is touching the touch panel 70a (hereinafter, referred to as a touch-on).

A finger or a pen touching the touch panel 70*a* moves (hereinafter, referred to as a touch-move).

A finger or a pen touching the touch panel 70*a* is released. In other words, a touch is ended (hereinafter, referred to as a touch-up).

Nothing touches the touch panel 70*a* (hereinafter, referred to as a touch-off).

In a case where a touch-down is detected, a touch-on is simultaneously detected. After a touch-down, a touch-on usually continues to be detected until a touch-up is detected. A touch-move is also detected while a touch-on is being detected. In a case where a touch-on is detected and the touch position does not move, a touch-move is not detected. After a touch-up of all fingers or pens touching the touch panel 70*a* is detected, a touch-off is detected.

Such operations and states and the position coordinates of a finger and a pen touching the touch panel 70*a* are notified to the system control unit 50 via an internal bus. The system control unit 50 determines what operation (touch operation) is performed on the touch panel 70*a* based on the notified information.

In a touch-move, a moving direction of a finger or a pen moving on the touch panel 70*a* can be determined in terms of a vertical component and a horizontal component on the touch panel 70*a* separately based on a change in the position coordinates.

In a case where a touch-move for a predetermined distance or more is detected, it is determined that a slide operation is performed. An operation of quickly moving a finger touching the touch panel 70*a* for some distance and immediately releasing the finger is referred to as a flick. In other words, a flick is an operation of quickly moving a finger over the touch panel 70*a* as if flicking. In a case where a touch-move is detected for a predetermined distance or more at a predetermined speed or higher and a touch-up is immediately detected, it is determined that a flick is performed (it can be determined that a flick is performed immediately after a slide operation).

Moreover, a touch operation of touching a plurality of positions (for example, two positions) together (performing a multi-touch) and bringing the touch positions closer to each other will be referred to as a pinch-in. A touch operation of separating the touch positions away from each other will be referred to as a pinch-out. A pinch-out and a pinch-in are referred to collectively as pinch operations (or simply pinches). The touch panel 70*a* may be a touch panel of any one of various methods including a resistive, capacitive, surface elastic wave, infrared, electromagnetic induction, image recognition, and optical sensor methods. Some methods detect a touch based on a contact on the touch panel. Some methods detect a touch based on approach of a finger or a pen to the touch panel. Either type may be used.

Figure 3:
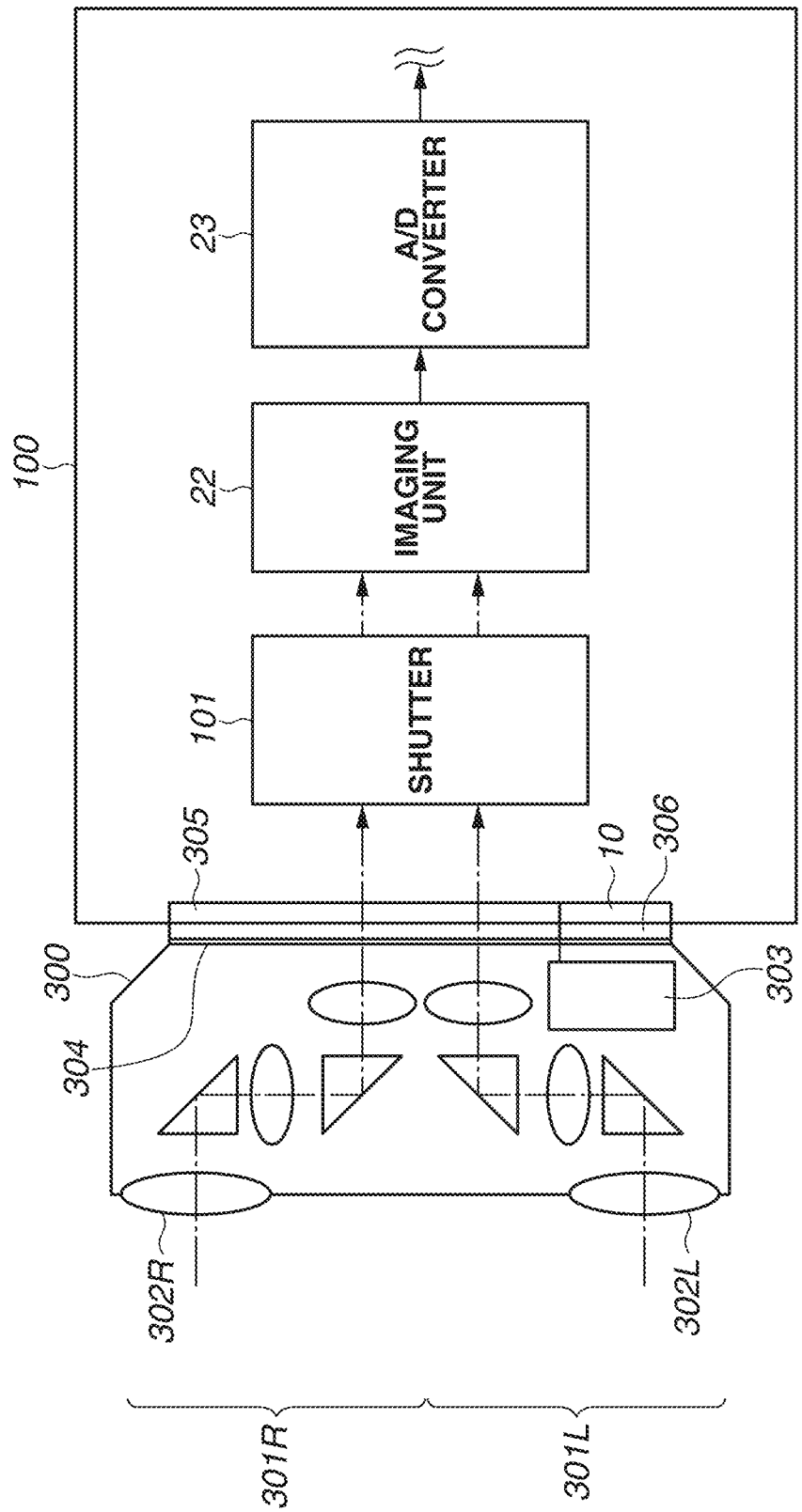
FIG. 3 is a schematic diagram illustrating an example of a configuration of a lens unit.

FIG. 3 is a schematic diagram illustrating an example of a configuration of a lens unit 300. FIG. 3 illustrates a state where the lens unit 300 is attached to the digital camera 100. Among the components of the digital camera 100 illustrated in FIG. 3, similar components to those described with reference to FIG. 2 are denoted by the same reference numerals. Redundant description of the components will be omitted as appropriate.

The lens unit 300 is a type of interchangeable lens detachably attachable to the digital camera 100. The lens unit 300 is a dual lens unit capable of obtaining left and right optical images having parallax. The lens unit 300 includes two optical systems (imaging lenses), each of which has a wide viewing angle of 180° and can capture an image of a hemispherical angle in front. Specifically, the two optical systems of the lens unit 300 can each input an optical object image having a field of view (angle of view) of 180° in a lateral direction (horizontal angle, azimuth angle, or yaw angle) and 180° in a vertical direction (vertical angle, elevation and depression angle, or pitch angle).

The lens unit 300 includes a right-eye optical system 301R including a plurality of lenses and reflection mirrors, a left-eye optical system 301L including a plurality of lenses and reflection mirrors, and a lens system control circuit 303. The right-eye optical system 301R corresponds to an example of a first optical system. The left-eye optical system 301L corresponds to an example of a second optical system. The right-eye optical system 301R and the left-eye optical system 301L include a lens 302R and a lens 302L, respectively, which are disposed on the object side and directed in the similar direction and have optical axes parallel to each other. Each of the right-eye optical system 301R and the left-eye optical system 301L is a fisheye lens and forms a circular optical image on the imaging unit 22 (sensor). The optical image input via the left-eye optical system 301L (left image) and the optical image input via the right-eye optical system 301R (right image) are formed on an imaging surface of a single imaging unit which is the imaging unit 22. The imaging unit 22 obtains an image including optical images of both of the right-eye optical system 301R and the left-eye optical system 301L.

The lens unit 300 according to the present exemplary embodiment is a VR180 lens (dual lens unit) for capturing a VR180 image. VR180 is a virtual reality (VR) image format for a dual-lens stereoscopic view. As the VR180 lens, each of the right- and left-eye optical systems 301R and 301L includes a fisheye lens that can capture a 180-degree angle. As the VR180 lens, lenses capable of covering a wide viewing angle of approximately 160° narrower than the 180-degree angle of view can also be used as long as the right- and left-eye optical systems 301R and 301L can each capture a video image for a VR180 dual-lens VR display. The VR180 lens can form the right image (first image) via the right-eye optical system 301R and the left image (second image), having parallax with the right image, via the left-eye optical system 301L on one or two image sensors of a camera to which the VR180 lens is attached. The digital camera 100 according to the present exemplary embodiment has a configuration in which the right image and the left image are formed on one image sensor (sensor), which is the imaging unit 22, to generate an image (dual-lens image) where an image corresponding to the right image and an image corresponding to the left image are laterally arranged. The dual-lens image here includes the image corresponding to the right image, the image corresponding to the left image, and an area where no optical image is formed (black area).

The lens unit 300 is attached to the digital camera 100 via a lens mount unit 304 of the lens unit 300 and a camera mount unit 305 of the digital camera 100. Thus, the system control unit 50 of the digital camera 100 and a lens system control circuit 303 of the lens unit 300 are electrically connected via the communication terminal 10 of the digital camera 100 and a communication terminal 306 of the lens unit 300.

In the present exemplary embodiment, the right image formed via the right-eye optical system 301R and the left image formed via the left-eye optical system 301L having parallax with the right image are formed on the imaging unit 22 of the digital camera 100 side by side. In other words, the two optical images formed by the right- and left-eye optical systems 301R and 301L are formed on one image sensor. The imaging unit 22 converts the formed object image (light signal) into an analog electrical signal to obtain image data on the dual-lens image. Using the lens unit 300, two images having parallax can thus be obtained simultaneously (as a set) from two components (optical systems), namely, the right-eye optical system 301R and the left-eye optical system 301L. Moreover, the user can view a stereoscopic VR image having the 180-degree angle of view, i.e., VR180 image, by dividing the obtained image into a left-eye image and a right-eye image and displaying the divided images in a VR manner.

With a conventional ordinary single-lens unit, an optical image incident on the lens unit is symmetrically inverted about a point of the optical axis center and input to the image sensor. An imaging apparatus like the digital camera 100 generates a realistic (not inverted) image by performing processing for reversing the reading order of the image sensor or inverting the read image. With a dual-lens unit, the input optical images are vertically symmetrically inverted but not laterally, i.e., the left image obtained via the left-eye optical system is input to the left area of the image sensor and the right image obtained via the right-eye optical system is input to the right area of the image sensor. When the conventional inversion processing is performed on such an image, the left and right with respect to the digital camera 100 become reverse to the left and right of the inverted image. Specifically, the left image obtained via the left-eye optical system is displayed to the right, and the right image obtained via the right-eye optical system is displayed to the left.

As employed herein, a VR image refers to an image capable of VR display to be described below. Examples of VR images include an omnidirectional image (spherical image) captured by an omnidirectional camera (spherical camera), and a panoramic image having a wider video angle of view (effective video angle) than a display angle capable of being displayed on a display unit at a time. VR images are not limited to still images and may also include a moving image and a live image (image obtained from a camera almost in real time). A VR image has a video angle of view (effective video angle) corresponding to a field of view of up to 360° in the lateral direction and 360° in the vertical direction. Even if an angle of view of an image is less than 360° in the lateral direction and less than 360° in the vertical direction, the image can also be included in VR images as images having a wider angle of view than an angle of view of an ordinary camera or images having a wider video angle of view than a display angle capable of being displayed on a display unit at a time. An image captured by the digital camera 100 using the lens unit 300 is a type of VR image. A VR image can be VR-displayed, for example, by setting the display mode of a display apparatus (display apparatus capable of displaying a VR image) to a "VR view". The user can view a laterally seamless omnidirectional video image by VR-displaying a VR image having an angle of view of 360° and changing the orientation of the display apparatus in the lateral direction (horizontal rotational direction).

As employed herein, a VR display (VR view) refers to a display method (display mode) for displaying a video image having a field of view corresponding to an orientation of the display apparatus and capable of changing the display area of the VR image. An example of the VR display is a "single-lens VR display (single-lens VR view)" that is for displaying a single image by transforming a VR image to perform mapping onto an imaginary sphere (transforming with distortion correction). Another example of the VR display is a "dual-lens VR display (dual-lens VR view)" that is for displaying images in the left and right areas side by side by individually transforming a VR image for the left eye and a VR image for the right eye to perform mapping onto respective imaginary spheres. A "dual-lens VR display" using a left-eye VR image and a right-eye VR image having parallax enables a stereoscopic view.

In any VR display, if, for example, the user wears a display apparatus, such as a head-mounted display (HMD), a video image having the field of view corresponding to the direction of the user's face is displayed. For example, in a case where a video image, of a VR image, having a field of view centered at 0° in the lateral direction (specific azimuth, such as the north) and 90° in the vertical direction (90° from the zenith, i.e., horizontal) is being displayed at a point in time, and when the orientation of the display apparatus is reversed (for example, the displaying side is turned from southward to northward), the display area is changed to a video image, of the same VR image, having a field of view centered at 180° in the lateral direction (reverse azimuth, such as the south) and 90° in the vertical direction. In other words, when the user wearing the HMD turns the user's head from the north to the south (i.e., turns back), the video image displayed on the HMD is also changed from a north image to a south image.

A VR image captured by using the lens unit 300 according to the present exemplary embodiment is a VR180 image having a 180-degree angle in front, without a video image of a 180-degree angle behind. If such a VR180 image is VR-displayed and the orientation of the display apparatus is changed to a side where there is no video image, a blank area is displayed.

Such VR display of a VR image visually makes the user feel as if being in the VR image (VR space). The method for displaying the VR image is not limited to that including changing the orientation of the display apparatus. For example, the display area may be moved (scrolled) based on a user operation using the touch panel 70a or the directional pad 74. During a VR display (during the display mode "VR view"), the display area may be changed based on a touch-move operation performed on the touch panel 70a, a drag operation performed on a mouse, or pressing of the directional pad 74 in addition to the change of the display area based on a change in orientation. A smartphone attached to a VR goggle (head-mount adaptor) is a type of HMD.

A dual-lens image captured by the digital camera 100 configured as described above via the lens unit 300 is an image including the right image and the left image input to the imaging unit 22 via the right-eye optical system 301R and the left-eye optical system 301L. The user using the digital camera 100 may enlarge and display a part of an LV image or a part of a recorded image to check for details. In enlarging an image, a center position of an area to be enlarged in the image may be consistently set at the center position of the entire image.

In a case of enlarging a part of a dual-lens image to check for details of the dual-lens image, a part of one of the right and left images is desirably displayed. If the center position of the area to be enlarged in the image is consistently set at the center of the entire image, parts of both the right and left images are included in the enlarged image. This causes difficulty for the users in intuitively identifying which part of the original image is displayed as the enlarged image. Specifically, in the enlarged image, a left end portion of the right image is displayed on the right and a right end portion of the left image is displayed on the left, which is an image having a lateral positional relationship different from that in the image capturing field of view.

A description will be given of a flowchart illustrated in FIG. 4 to describe processing that is performed by the digital camera 100 for performing LV zoom processing suitable in image capturing using a dual-lens unit like the lens unit 300 in the present exemplary embodiment.

Figure 4:
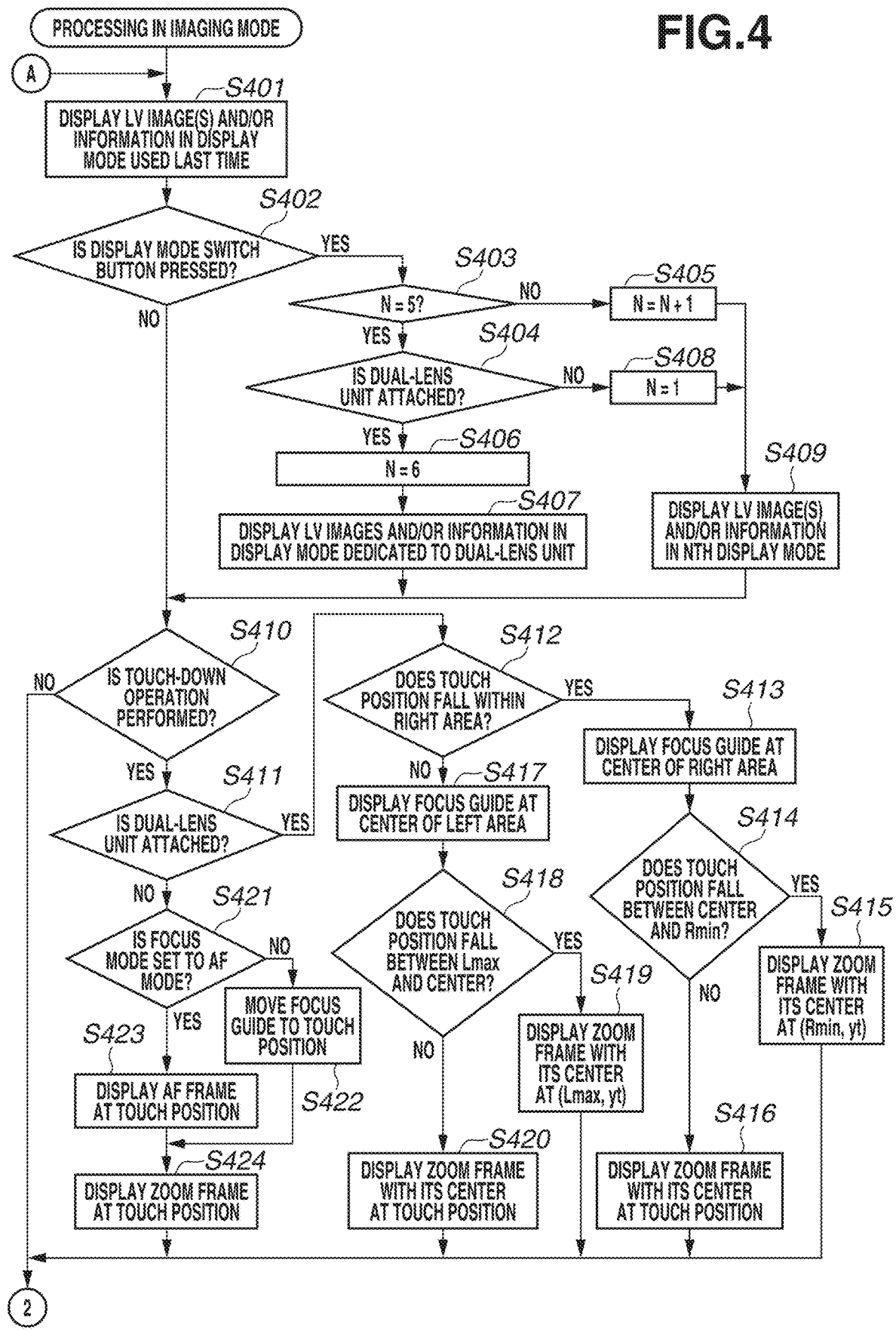
FIG. 4 is a flowchart illustrating display mode change processing by the digital camera and processing when a touch-down operation is performed during a live view according to an exemplary embodiment.

FIG. 4 is a flowchart illustrating an example of the processing that is performed by the digital camera 100 in the imaging mode. The flowchart of FIG. 4 is implemented by the system control unit 50 loading a program stored in the nonvolatile memory 56 into the system memory 52 and executing the program. The flowchart of FIG. 4 is started when the digital camera 100 is in the imaging standby state after the power is turned on. When a processing procedure of the flowchart (hereinafter, may be referred to as a control flowchart) of FIG. 4 is started, the system control unit 50 initializes control variables and starts processing.

Display examples of the display unit 28 in executing the processing procedure of the control flowchart of FIG. 4 will be described with reference to FIGS. 5A to 5F. Details of the display examples illustrated in FIGS. 5A to 5F will be described after the description of the control flowchart of FIG. 4.

In step S401, the system control unit 50 obtains a display mode used last time based on a flag (N) stored in the nonvolatile memory 56, and displays an LV image or images and/or information about imaging on the display unit 28, based on the display mode used last time. For example, in a case where the processing procedure of the flowchart is started by power-on, the display mode used last time corresponds to a mode at a timing of when the digital camera 100 has been powered off the last time. In a case where the flowchart is started by switching from a mode other than the imaging mode, such as the playback mode, to the imaging mode, the display mode used last time corresponds to a mode at the timing of when processing has been performed in the imaging mode the last time.

In step S402, the system control unit 50 determines whether the display mode switch button 83 is pressed. In a case where the display mode switch button 83 is pressed (YES in step S402), the processing proceeds to step S403. In a case where the display mode switch button 83 is not pressed (NO in step S402), the processing proceeds to step S410.

In step S403, the system control unit 50 refers to the system memory 52 and determines whether the flag N indicating the display mode is 5 (N=5). In a case where the flag N is 5 (YES in step S403), the processing proceeds to step S404. In a case where the flag N is not 5 (NO in step S403), the processing proceeds to step S405.

In step S404, the system control unit 50 determines whether the lens unit attached via the communication terminals 6 and 10 is a dual-lens unit. In a case where the attached lens unit is a dual-lens unit (YES in step S404), the processing proceeds to step S406. In a case where the attached lens unit is not a dual-lens unit (i.e., the attached lens unit is an ordinary single-lens unit or no lens unit is attached) (NO in step S404), the processing proceeds to step S408. The dual-lens unit includes a left lens and a right lens, each of which is a wide-angle fisheye lens capable of capturing an image, of the side where the lens is disposed, having at least a 180-degree angle of view on the object-side. A left image and a right image formed in the left-eye optical system 301L and the right-eye optical system 301R can be captured by one or two image sensors.

In step S405, the system control unit 50 increments the flag N indicating the display mode by one (N=N+1), and stores the flag N in the system memory 52.

In step S406, the system control unit 50 sets the flag N to 6 (N=6), and stores the flag N in the system memory 52.

In step S407, the system control unit 50 displays the LV images and/or information in a display mode dedicated to a dual-lens unit on the display unit 28. FIG. 5F illustrates a display example of this processing. FIG. 5F will be described in detail below.

In step S408, the system control unit 50 sets the flag N to 1 (N=1), and stores the flag N in the system memory 52.

In step S409, the system control unit 50 displays the LV image(s) and/or information on the display unit 28 in the display mode corresponding to the numerical value of the flag N stored in the system memory 52. FIGS. 5A to 5E illustrate display examples, displayed on the display unit 28, each corresponding to different one of display mode. Since the processing can also reach this step S409 in the case where the determination of step S404 is NO, the LV image(s) and/or information on the display unit 28 is also displayed in the display mode corresponding to the numerical value of the flag N (N=1) even in a case where a dual-lens unit is not attached, i.e., in a case where a single-lens unit is attached or no lens unit is attached.

The display examples of the LV image and information displayed on the display unit 28 will be described with reference to FIGS. 5A to 5F. FIGS. 5A to 5D and 5F illustrate a case where a dual-lens unit is attached to the digital camera 100 and two LV images are displayed. In a case where a single-lens unit is attached, a similar display is provided except that one LV image is displayed. In a case where a single-lens unit is attached, as described above with reference to FIG. 4, the display mode will not transition to a mode for display illustrated in FIG. 5F. The information displayed on the display unit 28 is changed each time the user performs a display mode change operation (in the present exemplary embodiment, presses the display mode switch button 83). Specifically, the system control unit 50 provides any one of displays of FIGS. 5A to 5F based on the numerical value of the flag N each indicating a different display mode, described above with reference to FIG. 4. In the present exemplary embodiment, the LV images displayed on the display unit 28 are circular fisheye display. However, equirectangular conversion processing may be performed on the circular fisheye display of the LV images to provide equirectangular display.

Figure 5A:
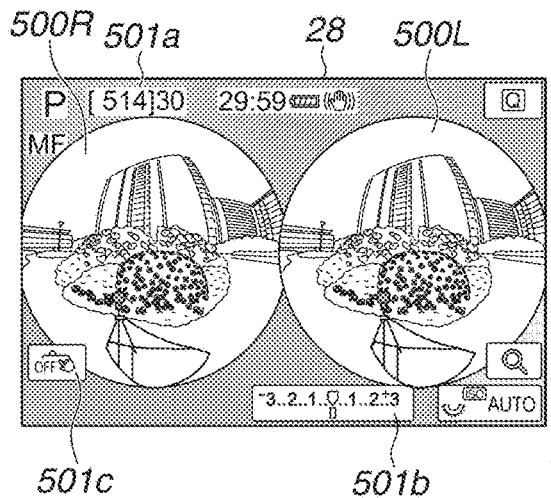
FIGS. 5A to 5F are diagrams illustrating examples of a live view display on the digital camera on which a dual-lens unit is attached, according to the present exemplary embodiment.

FIG. 5A illustrates a display mode of a case where the flag N=1, i.e., in a case where the digital camera 100 is powered on and LV images are displayed on the display unit 28 in the imaging standby state. Two laterally arranged LV images (hereinafter, may be referred to as an LV image 500R and an LV image 500L) are displayed on the display unit 28 along with information displays 501a to 501c. The two laterally arranged LV images here will be referred to as side-by-side images. The information displays 501a to 501c indicate minimum imaging information considered to be desirable when the user captures an image. In a case where the display mode switch button 83 is pressed in the state illustrated in FIG. 5A, the display mode transitions to a display mode illustrated in FIG. 5B.

Figure 5B:
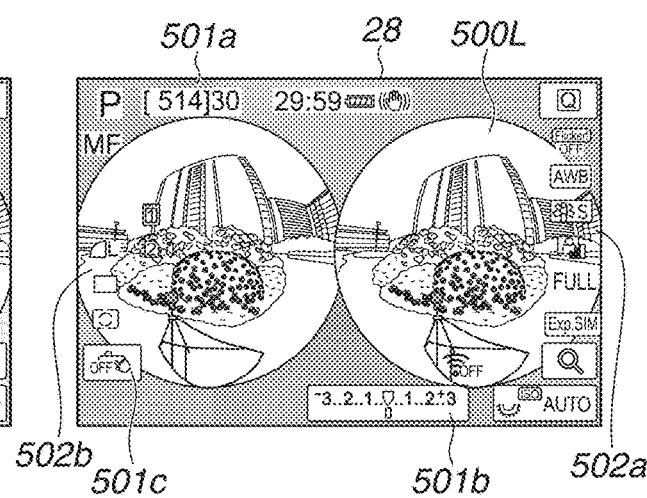

FIG. 5B illustrates a display mode of a case where the flag N=2. In FIG. 5B, information displays 502a and 502b are displayed in addition to the LV images 500R and 500L, and the information displays 501a to 501c. Like the information displays 501a to 501c, the information displays 502a and 502b indicate various types of imaging information related to imaging (for example, currently set setting values and the type of recording medium 200 inserted). Since the amount of information increases in addition to the information displays 501a to 501c, the user can visually observe more imaging information. Meanwhile, the visibility of the LV images can drop. In a case where the display mode switch button 83 is pressed in the state illustrated in FIG. 5B, the display mode transitions to a display mode illustrated in FIG. 5C.

Figure 5C:
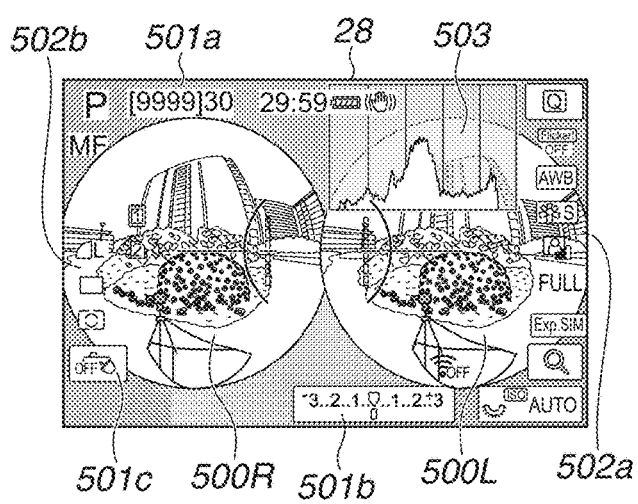

FIG. 5C illustrates a display mode of a case where the flag N=3. In FIG. 5C, an information display 503 that is a histogram of the currently captured LV images is displayed in addition to the LV images 500R and 500L, and the information displays 501a to 501c, 502a, and 502b. The information display 503 is a graph with brightness on the lateral axis and the number of pixels on the vertical axis. The information display 503 provides a rough indication of how bright the currently captured LV images are, the tendency of exposure levels, and the gradations of the entire LV images. The information display 503 is displayed since some users may want to check it during imaging. The information display 503 is superimposed on a relatively large area of the LV image 500L and thus causes a drop in visibility. In a case where the display mode switch button 83 is pressed in the state illustrated in FIG. 5C, the display mode transitions to a display mode illustrated in FIG. 5D.

Figure 5D:
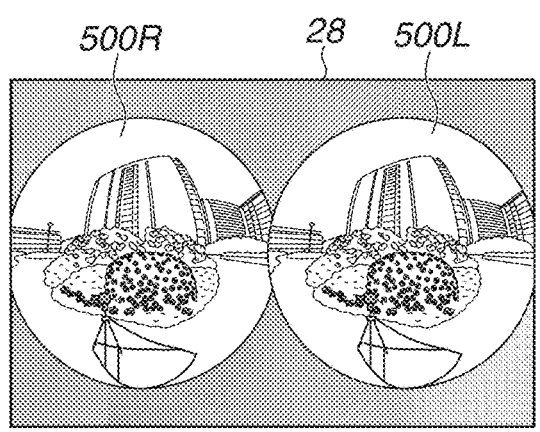

FIG. 5D illustrates a display mode of a case where the flag N=4. In the display mode of FIG. 5D, all the information displays 501a to 501c, 502a, 502b, and 503 are hidden and only the LV images 500R and 500L are displayed. Such a display enables the user to perform image capturing while visually observing only the LV images without being bothered by various types of imaging information. In a case where the display mode switch button 83 is pressed in the state illustrated in FIG. 5D, the display mode transitions to a display mode illustrated in FIG. 5E.

Figure 5E:
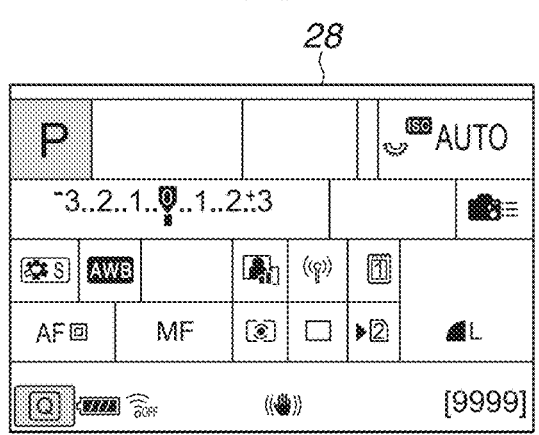
Figure 5F:
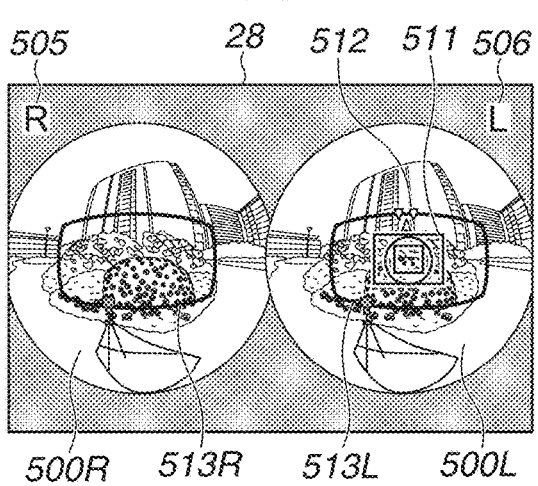

FIG. 5E illustrates a display mode of a case where the flag N=5. In the display mode of FIG. 5E, the LV images 500R and 500L are not displayed, and only imaging-related information is displayed in a table-like form. In a case where the display mode switch button 83 is pressed in the state illustrated in FIG. 5E, and when a dual-lens unit is attached, the display mode transitions to that illustrated in FIG. 5F, and when a single-lens unit is attached or no lens unit is attached, the display mode transitions to that illustrated in FIG. 5A.

FIG. 5F illustrates a display mode of a case where the flag N=6 (step S407 in FIG. 4). Specifically, this display mode is entered in a case where a dual-lens unit is attached to the digital camera 100. Here, the display unit 28 displays the LV images 500R and 500L, information displays 505 and 506, and a zoom frame 511, a focus guide 512, and magic windows 513R and 513L (hereinafter, collectively referred to magic windows 513) which are superimposed on the LV images. The information display 505, or "R" meaning right, indicates that the LV image 500R is the LV image (right image) captured by the right-eye optical system 301R. The information display 506, or "L" meaning left, indicates that the LV image 500L is the LV image (left image) captured by the left-eye optical system 301L.

In an optical system, such as the optical system in the digital camera 100, the image captured by the image sensor (imaging unit 22) is vertically inverted. The vertically inverted image is vertically inverted by 180° and displayed on the display unit 28 or the EVF 29. With such a structure taken into account, the case of image capturing using the lens unit (dual-lens unit) including the left- and right-eye optical systems 301L and 301R illustrated in FIG. 3 will be described. As described above, if two LV images captured via the left- and right-eye optical systems 301L and 301R and input to the imaging unit 22 are displayed on the display unit 28 without inversion processing, the vertically inverted LV images are displayed, which impairs usability. Inversion processing is thus performed on the two LV images input to the imaging unit 22 as in the case where a single-lens unit is attached.

However, when the inversion processing is performed, the two LV images are displayed on the display unit 28 in such a manner that the LV image (right image) obtained via the right-eye optical system 301R is displayed in the left area, and the LV image (left image) obtained via the left-eye optical system 301L is displayed in the right area. In particular, in the present exemplary embodiment, a processing load of processing for identifying a border between the two LV images on the image sensor and replacing the left and right LV images would be high in the system control unit 50 since the two LV images are captured using one image sensor (imaging unit 22). The LV images input to the imaging unit 22 are thus vertically inverted by 180° and displayed on the display unit 28 without replacing the left and right images.

When two LV images are displayed on the display unit 28, the user usually considers that the LV image displayed in the left area is the one captured by the left-eye optical system 301L, and the LV image displayed in the right area is the one captured by the right-eye optical system 301R. In other words, without the information displays 505 and 506, the user is likely to miss the fact that the left and right LV images are laterally reversed, and can get confused during imaging unless the user is aware of the lateral reversal. Thus, the information displays 505 and 506 are displayed so that the user can clearly visually recognize which LV image is captured by which of the left- and right-eye optical systems 301L and 301R.

The zoom frame 511 superimposed on the LV image 500L is a frame display that indicates the area to be enlarged in the LV image 500L in response to a zoom instruction (to be described below in step S801 of FIG. 8A) issued by the user. The focus guide 512 includes a frame indicating a focus detection area and an indicator displaying a degree of in-focus on an object at the position where the frame is superimposed, using markers or color information. In the present exemplary embodiment, the degree of in-focus is expressed by three markers displayed above or below the focus detection area. The focus guide 512 in FIG. 5F shows that the object at the position where the frame is displayed is not in focus and in a state of rear focus (the in-focus position is behind the object and the object is not in focus). In a case where the object is not in focus, the focus guide 512 is displayed in white. Once in-focus state is achieved, the three markers are changed to two markers, and the focus guide 512 is displayed in green.

The magic windows 513 are indicators displayed on the display unit 28 and indicate areas to be initially displayed before the user moves the point of view. The magic windows 513 indicate areas to be initially displayed before the user moves the point of view in generating a 180-degree image (hemispherical image) from the LV images 500R and 500L and reproducing the 180-degree image on a browser or an HMD. Since the magic windows 513 are displayed on the LV images 500R and 500L, the areas to be initially displayed during playback, i.e., the initial areas for the viewer to view can be visually observed during imaging. The user can thus more effectively capture an image of a desired object in a desired composition.

The magic windows 513 are indicators for generating a 180-degree image, i.e., special indicators considered to be particularly useful to the user in image capturing using a dual-lens unit attached on the digital camera 100. The display mode illustrated in FIG. 5F is thus not displayed when a single-lens unit is attached. Since the magic windows 513 are displayed at fixed positions, and magic windows 513 are not needed to be constantly displayed in subsequent imaging operations after the user checks the areas of the magic windows 513.

In the present exemplary embodiment, the zoom frame 511 and the focus guide 512 are superimposed on one of the LV images 500R and 500L. The magic windows 513 are superimposed on the respective images of the LV images 500R and 500L. The zoom frame 511 indicates the position to be enlarged, and is thus desirably displayed singly. By contrast, the focus guide 512 may be displayed on each of the two LV images instead of one.

Next, processing in a case where a touch-down operation is performed on the touch panel 70a will be described. The system control unit 50 of the digital camera 100 displays an item related to focus control and an item indicating a zoom area in the image, in response to a touch-down operation performed on the touch panel 70a during image display. In a case where the lens unit attached to the digital camera 100 is not a dual-lens unit (but a conventional single-lens unit), the system control unit 50 displays a focus guide indicating the degree of in-focus or an AF frame indicating an AF target area at a position corresponding to the touch-down. In a case where the lens unit attached to the digital camera 100 is a dual-lens unit, the system control unit 50 displays the focus guide indicating the degree of in-focus at the center of either one of the area displaying the left image and the area displaying the right image (return to the center), in response to the touch-down operation. The system control unit 50 further displays a zoom frame indicating the zoom area at the position corresponding to the touch-down. In a case where the lens unit attached to the digital camera 100 is a dual-lens unit, the system control unit 50 displays the zoom frame at a position not including both the left and right images.

In step S410, the system control unit 50 determines whether a touch-down operation is performed on the touch panel 70a. In a case where a touch-down operation is performed (YES in step S410), the system control unit 50 stores coordinates (xt, yt) indicating a position of the touch-down operation (touch position), and the processing proceeds to step S411. In a case where a touch-down operation is not performed (NO in step S410), the processing proceeds to step S601 of FIG. 6A.

In step S411, like step S404, the system control unit 50 determines whether the lens unit attached via the communication terminals 6 and 10 is a dual-lens unit. In a case where the attached lens unit is a dual-lens unit (YES in step S411), the processing proceeds to step S412. In a case where the attached lens unit is not a dual-lens unit (NO in step S411), the processing proceeds to step S421.

Figure 7A:
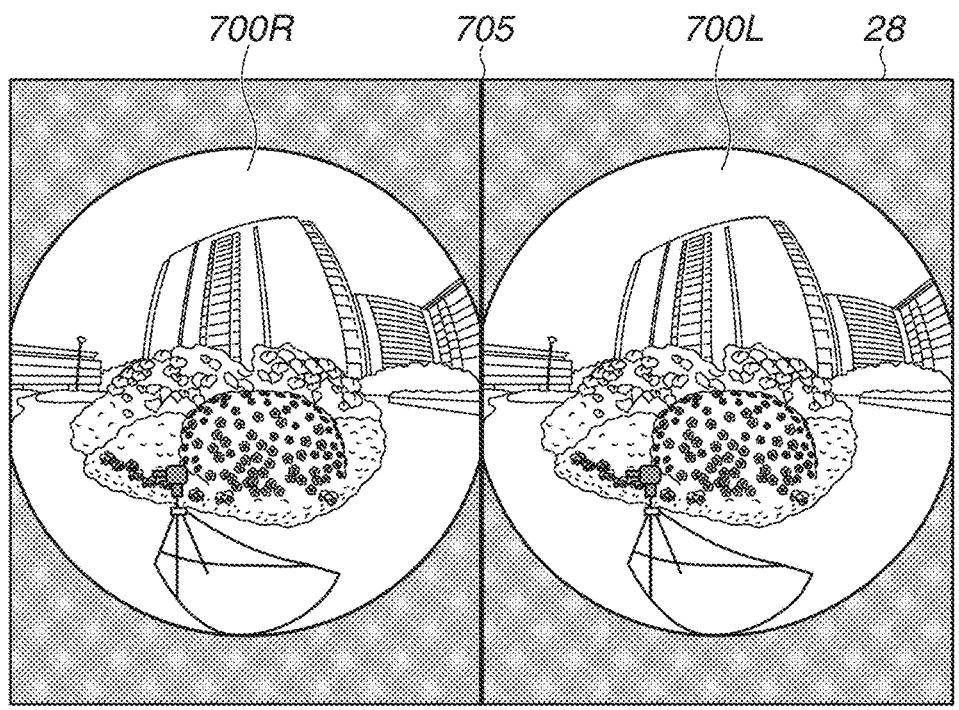
FIGS. 7A and 7B are diagrams illustrating a border between left and right live view images on the digital camera on which the dual-lens unit is attached, according to the present exemplary embodiment.
Figure 7B:
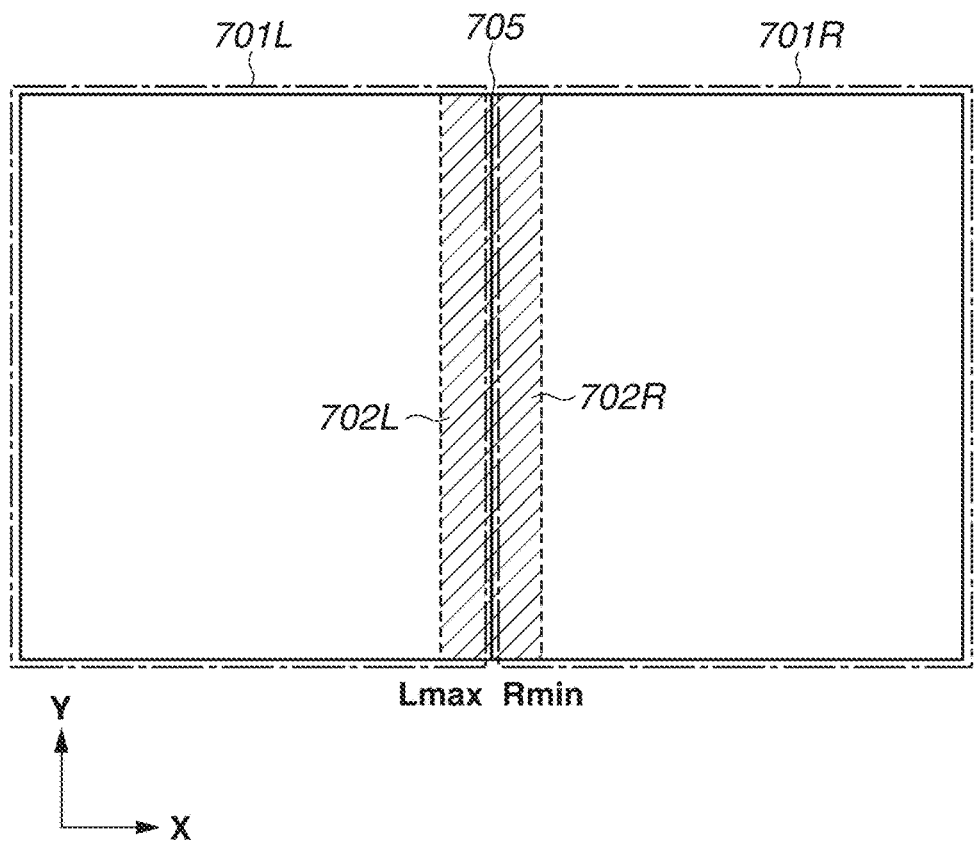

In step S412, the system control unit 50 determines whether the touch position (touch-down position) of the touch-down operation performed on the touch panel 70a in step S410 falls within the right area (area 701R) of the dual-lens image. FIGS. 7A and 7B are schematic diagrams illustrating a display example where a dual-lens image is displayed. In a case where the touch position falls within the right area (area 701R) (YES in step S412), the processing proceeds to step S413. In a case where the touch position falls within the left area (area 701L) (NO in step S412), the processing proceeds to step S417. A line 705 is the borderline between the LV images (LV 700R and LV 700L) captured by the right- and left-eye optical systems 301R and 301L, respectively. In the present exemplary embodiment, the line 705 is the centerline by which the imaging unit 22 is divided into two areas of the left and right areas.

In step S413, the system control unit 50 displays the focus guide at the center of the right area (returns the display position to the center). In a case where the focus guide has already been superimposed on the LV image in the left or right area, the focus guide is moved to the center of the right area (center of the LV image which is captured by the left-eye optical system 301L and displayed in the right area). The focus guide 512 in FIG. 5F is a display example here. The focus guide includes a frame indicating the focus detection area and a plurality of markers that indicates the degree of in-focus in the focus detection area using a relationship between respective display positions of the markers. Based on the relationship between the display positions of the markers, the user can visually observe whether the object at the display position of the focus detection area is in focus, how far the object is out of focus, and to which side of forward or rear the object in the focus detection area is out of focus when the object is out of focus. The display mode of the focus guide is not limited the above-described configuration. For example, the focus guide may indicate the degree of in-focus using colors.

In step S414, the system control unit 50 determines whether the touch position of the touch-down operation performed on the touch panel 70a in step S410 is near the border. Specifically, the system control unit 50 determines whether the touch position falls within an area between the line 705 illustrated in FIGS. 7A and 7B and a line at a predetermined distance to the right from the line 705. In a case where the touch position falls within the area (YES in step S414), the processing proceeds to step S415. In a case where the touch position does not fall within the area (NO in step S414), the processing proceeds to step S416. The predetermined distance here is one half the lateral length of the zoom frame. The predetermined distance can be freely set. The position on the touch panel 70a is expressed in an xy coordinate system. The x coordinate of the line at the predetermined distance to the right from the line 705 will be denoted by a coordinate Rmin. In other words, in a case where the x component of the center coordinates of the zoom frame is the coordinate Rmin, the left side of the zoom frame touches (overlaps) the line 705. In a case where the x component of the center coordinates of the zoom frame is less than the coordinate Rmin, i.e., falls within an area 702R, the zoom frame extend over the border between the left and right areas.

In step S415, the system control unit 50 displays the zoom frame with the center of the zoom frame at coordinates (Rmin, yt). By such control, even in a case where the user performs the touch-down operation near the line 705, the zoom frame is displayed in a state not crossing the line 705 and including only the image in the right area.

In step S416, the system control unit 50 displays the zoom frame with the center of the zoom frame at the coordinates (xt, yt) of the touch position.

In step S417, the system control unit 50 displays the focus guide at the center of the left area (center of the LV image displayed in the left area, captured by the right-eye optical system 301R). In a case where the focus guide has already been superimposed on the LV image, the system control unit 50 moves the focus guide to the center of the left area.

In step S418, the system control unit 50 determines whether a touch position of the touch-down operation performed on the touch panel 70a in step S410 falls within an area between the line 705 illustrated in FIGS. 7A and 7B and a line at a predetermined distance to the left from the line 705. In a case where the touch position falls within the area (YES in step S418), the processing proceeds to step S419. In a case where the touch position does not fall within the area (NO in step S418), the processing proceeds to step S420. As described in step S414, the predetermined distance is one half the lateral length of the zoom frame. The predetermined distance may be freely set by the user. Here, an x coordinate of the line at the predetermined distance to the left from the line 705 will be denoted by a coordinate Lmax. In other words, in a case where the x component of the center coordinates of the zoom frame is the coordinate Lmax, the right side of the zoom frame touches (overlaps) the line 705. In a case where the x component of the center coordinates of the zoom frame is greater than the coordinate Lmax, i.e., falls within an area 702L, the zoom frame extend over the border between the left and right areas.

In step S419, the system control unit 50 displays the zoom frame with the center of the zoom frame at coordinates (Lmax, yt).

In step S420, the system control unit 50 displays the zoom frame with the center of the zoom frame at the coordinates (xt, yt) of the touch position.

By the above-described control, even in a case where the user designates the position of the zoom frame by performing a touch operation on an area including the vicinity of the line 705, the zoom frame is prevented from being displayed over both the left and right areas. If the zoom frame is displayed over both the left and right areas and the user performs a zoom operation (press the zoom button 78), as will be described below, the border between the left and right LV images is enlarged, which can confuse the user. Thus, according to the present exemplary embodiment, the zoom frame is prevented from being displayed over both the left and right areas.

Next, control to be performed in response to the touch-down operation in a case where the lens attached to the digital camera 100 is not a dual-lens unit (but a single-lens unit) will be described.

In step S421, the system control unit 50 refers to the nonvolatile memory 56, and determines whether a focus mode is set to an AF mode or a manual focus (MF) mode. In a case where the focus mode is set to the MF mode (NO in step S421), the processing proceeds to step S422. In a case where the focus mode is set to the AF mode (YES in step S421), the processing proceeds to step S423. In a case where the focus mode is the MF mode and a focus guide display setting is on, the system control unit 50 displays the focus guide for assisting focusing by MF operations.

In step S422, the system control unit 50 moves the focus guide to the touch position designated by the user in step S410.

In step S423, the system control unit 50 displays an AF frame indicating the in-focus position at the touch position designated by the user in step S410.

In step S424, the system control unit 50 displays the zoom frame at the touch position of the touch-down operation performed in step S410.

In other words, in a case where the lens unit attached to the digital camera 100 is not a dual-lens unit (but a single-lens unit), the zoom frame and the focus guide are displayed at the user's touch position regardless of the settings of the focus mode. The zoom frame is displayed in a manner linked with the AF frame and the focus detection area indicated by the focus guide. By contrast, in a case where a dual-lens unit is attached, the display position of the zoom frame is not linked with the focus detection area indicated by the focus guide.

In the present exemplary embodiment, in a case where a dual-lens unit is attached, the display position of the focus guide is fixed to the center of the display area of the left or right LV image. If the display position of the focus guide and the display position of the zoom frame are moved in synchronization with each other, a zoom area is limited to the center area of the LV image, which leads to poor usability. Moreover, in a case where a dual-lens unit is attached, two LV images are displayed on the display unit 28. Consequently, each LV image has a size less than or equal to one half the size of the LV image of when a single-lens unit is attached. The user is thus likely to enlarge the LV images and check the LV images in more details a greater number of times than when a single-lens unit is attached. The zoom frame (i.e., the zoom area of the LV images) is thus not linked with the focus guide, so that the user can freely check desired positions.

The focus guide may be configured to not be fixed to the center. Even in such a case, the focus guide and the zoom frame are not moved in synchronization with each other when a dual-lens unit is attached. The user finely adjusting the focus using the focus guide may also want to zoom in on a position other than the focus position to observe more details. For example, in a case where the user wants to zoom in the inside areas of the foregoing magic windows or areas near the circumferences of the LV images in the circular fisheye display and observe the enlarged areas, unlinking the positions of the focus guide and the zoom frame provides better operability for the user.

Figure 6A:
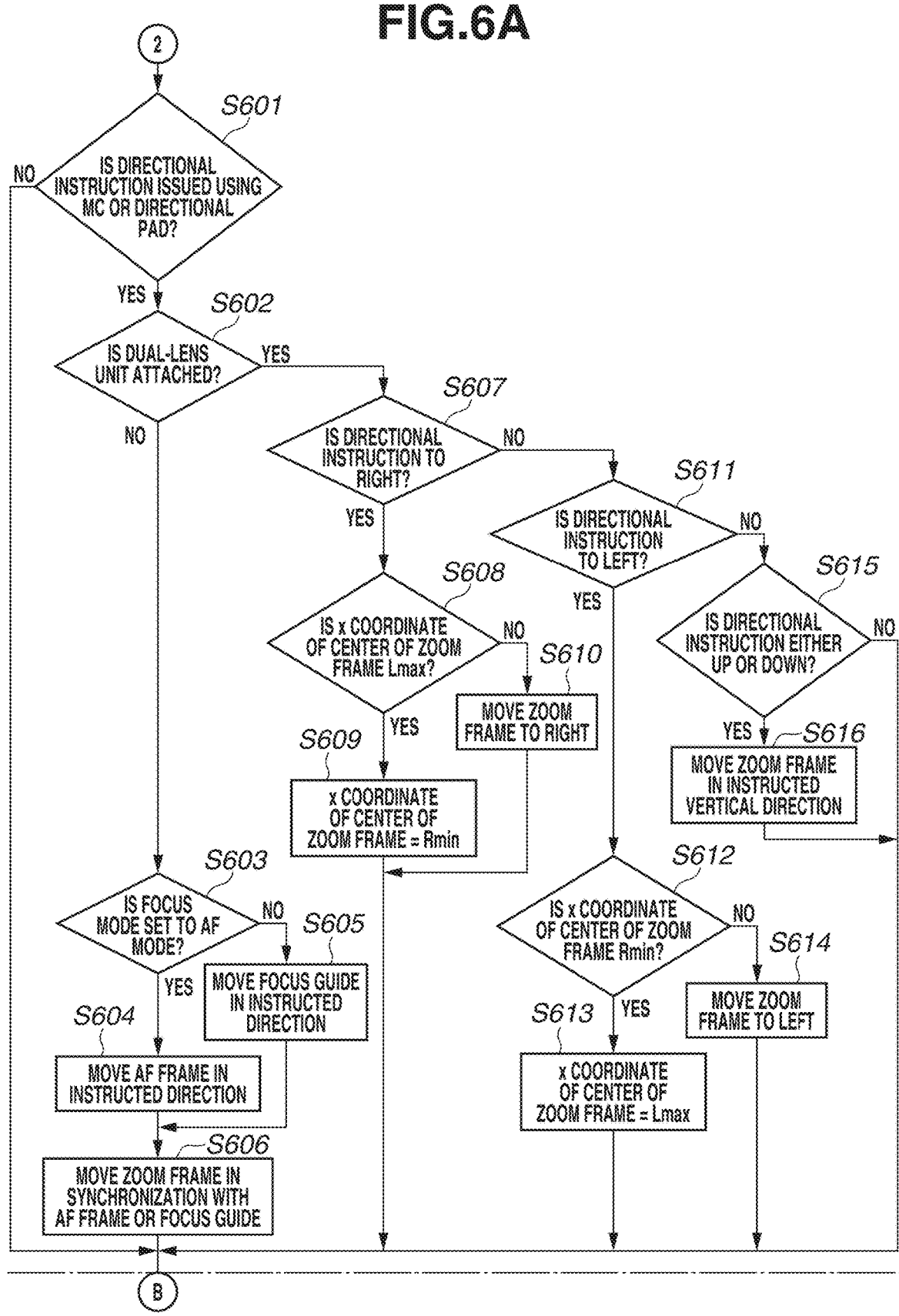
FIGS. 6A and 6B are a flowchart illustrating zoom frame moving processing by the digital camera according to the present exemplary embodiment.
Figure 6B:
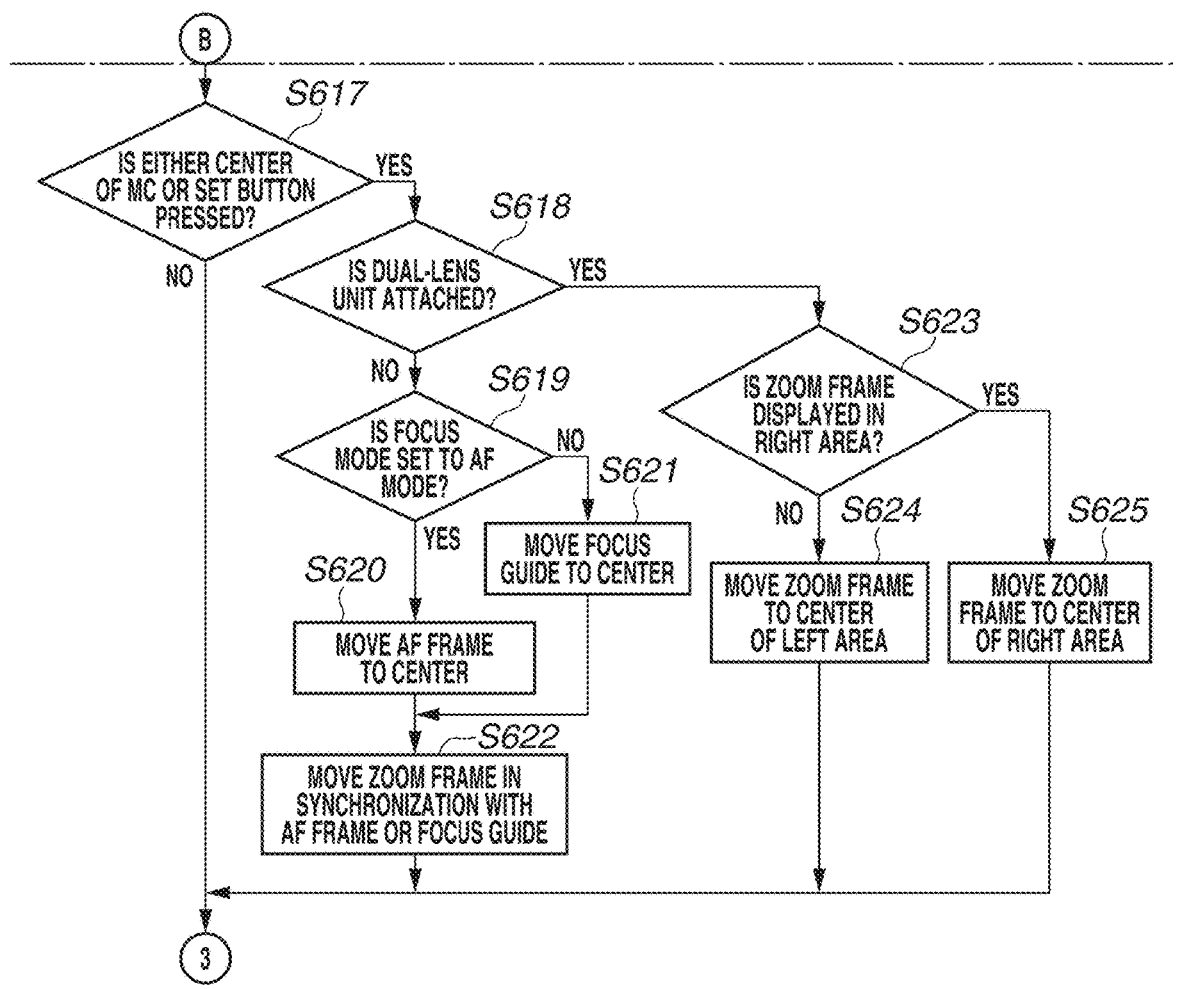

FIGS. 6A and 6B are a control flowchart about display control of the digital camera 100 in a case where an operation member capable of issuing directional instructions according to the present exemplary embodiment is operated.

The system control unit 50 of the digital camera 100 moves the position of an item, such as the zoom frame, (designates the position of the item) in a dual-lens image in response to a directional instruction during displaying of the dual-lens image and the item. In a case where the lens unit attached to the digital camera 100 is not a dual-lens unit (but a conventional single-lens unit), the system control unit 50 moves the focus guide or the AF frame, and the zoom frame, based on the directional instruction.

In a case where the lens unit attached to the digital camera 100 is a dual-lens unit, the system control unit 50 moves the zoom frame based on the directional instruction. Here, the system control unit 50 does not move the focus guide. Further, the zoom frame is displayed in the right area of the display unit 28 in such a manner that the zoom frame does not include both the left and right images. In response to an instruction to move the zoom frame displayed near the border to the left, the system control unit 50 moves the display position of the zoom frame to the left area. The zoom frame is displayed in the left area of the display unit 28 in such a manner that the zoom frame does not include both the left and right images. In response to an instruction to move the zoom frame displayed near the border to the right, the system control unit 50 moves the display position of the zoom frame to the left area.

In step S601, the system control unit 50 determines whether a directional instruction is issued using the multi-controller (MC) 82 or the directional pad 74 of the operation unit 70. In a case where a directional instruction is issued (YES in step S601), the processing proceeds to step S602. In a case where a directional instruction is not issued (NO in step S601), the processing proceeds to step S617.

In step S602, like step S411, the system control unit 50 obtains the type of lens unit attached via the communication terminals 6 and 10, and determines whether the lens unit is a dual-lens unit. In a case where the attached lens unit is a dual-lens unit (YES in step S602), the processing proceeds to step S607. In a case where the attached lens unit is not a dual-lens unit (NO in step S602), the processing proceeds to step S603.

In step S603, like step S421, the system control unit 50 determines whether the currently set focus mode of the digital camera 100 is the AF mode or the MF mode. In a case where the current focus mode is the AF mode (YES in step S603), the processing proceeds to step S604. In a case where the current focus mode is the MF mode (NO in step S603), the processing proceeds to step S605. In a case where the currently set focus mode is the MF mode and the focus guide display setting for assisting MF focusing is on, the system control unit 50 superimposes the focus guide on the LV image displayed on the display unit 28.

In step S604, the system control unit 50 moves the AF frame displayed on the display unit 28 in the direction instructed in step S601.

In step S605, the system control unit 50 moves the focus guide displayed on the display unit 28 in the direction instructed in step S601. While the entire focus guide is moved in this process, the frame indicating the focus detection area may be moved instead of the entire focus guide. In a case where the focus guide display setting is set to off by a user setting, this step S605 is skipped.

In step S606, the system control unit 50 moves the zoom frame displayed on the display unit 28 in synchronization with the position of the AF frame or the frame indicating the focus detection area of the focus guide moved in step S604 or S605.

In step S607, the system control unit 50 determines whether the directional instruction issued using the MC 82 or the directional pad 74 and determined in step S601 is to the right. In a case where the directional instruction is to the right (YES in step S607), the processing proceeds to step S608. If not (NO in step S607), the processing proceeds to step S611.

In step S608, the system control unit 50 determines whether the x coordinate of the center of the zoom frame before the directional instruction is issued in step S601 is the coordinate Lmax. In a case where the x coordinate of the center is the coordinate Lmax (YES in step S608), the processing proceeds to step S609. In a case where the x coordinate of the center is not the coordinate Lmax (NO in step S608), the processing proceeds to step S610. If the x coordinate of the center of the zoom frame before the directional instruction is issued is Lmax, the right side of the zoom frame touches the line 705 before the input of the directional instruction.

In step S609, the system control unit 50 moves the zoom frame to a position where the center of the zoom frame is coordinates (Rmin, the y coordinate before the directional instruction). In other words, in a case where the zoom frame is displayed in the left area with the right side of the zoom frame touching the line 705 and an instruction to move the zoom frame further to the right is input, the zoom frame is moved to the right area. Such control prevents the zoom frame from being displayed over both the left and right areas.

In this step, a dual-lens unit is attached to the digital camera 100 since the determination of step S602 is YES. Thus, two LV images are displayed on the display unit 28 and displayed in the respective left and right halves of the display unit 28. In a case where the zoom frame is moved, and if the display position of the zoom frame is controlled and allowed to include both the left and right areas by crossing the line 705 illustrated in FIGS. 7A and 7B, an enlarged image including both the left and right LV images is displayed when a zoom instruction is issued by the user, which may confuse the user. Thus, in a case where the zoom frame is moved, and in a case where the left or right side of the zoom frame reaches the border between the left and right areas indicated by the line 705, the entire zoom frame is displayed in one of the left and right areas so that the zoom frame does not cross the line 705 (not include both the left and right areas).

In step S610, the system control unit 50 moves the display position of the zoom frame to the right. Here, the amount of movement by which the display position is moved in response to one directional instruction is one pixel of the display unit 28. In a case where the right side of the zoom frame reaches the right side of the area 701R (right end of the display unit 28) and a movement instruction (directional instruction) to the right is issued, the system control unit 50 does not move the zoom frame.

In step S611, the system control unit 50 determines whether the directional instruction issued using the MC 82 or the directional pad 74 and is determined in step S601 is to the left. In a case where the directional instruction is to the left (YES in step S611), the processing proceeds to step S612. If not (NO in step S611), the processing proceeds to step S615.

In step S612, the system control unit 50 determines whether the x coordinate of the center of the zoom frame before the directional instruction is issued in step S601 is the coordinate Rmin. In a case where the x coordinate of the center is the coordinate Rmin (YES in step S612), the processing proceeds to step S613. In a case where the x coordinate of the center is not the coordinate Rmin (NO in step S611), the processing proceeds to step S614. In a case where the x coordinate of the center of the zoom frame before the directional instruction is issued is the coordinate Rmin, the left side of the zoom frame touches the line 705 before the input of the directional instruction.

In step S613, the system control unit 50 moves the zoom frame to a position where the center of the zoom frame is to coordinates (Lmax, the y coordinate before the directional instruction). In other words, in a case where the zoom frame is displayed in the right area with the left side of the zoom frame touching the line 705, in response to input of an instruction to movement the zoom frame further to the left, the zoom frame is moved to the left area. Such control prevents the zoom frame from being displayed over both the left and right areas.

In step S614, the system control unit 50 moves the display position of the zoom frame to the left. Here, the amount of movement by which the display position is moved in response to one directional instruction is one pixel of the display unit 28. In a case where the left side of the zoom frame reaches the left side of the area 701L (left end of the display unit 28) and a movement instruction to the left is issued, the system control unit 50 does not move the zoom frame.

In step S615, the system control unit 50 determines whether the directional instruction issued using the MC 82 or the directional pad 74 and determined in step S601 is either up or down. In a case where the directional instruction is up or down (YES in step S615), the processing proceeds to step S616. In a case where the directional instruction is neither up nor down (NO in step S615), the processing proceeds to step S617.

In step S616, the system control unit 50 moves the display position of the zoom frame in the instructed vertical direction. The amount of movement by which the display position is moved in response to one directional instruction here is one pixel of the display unit 28.

In a case where, in step S602, the system control unit 50 determines that a dual-lens unit is attached to the digital camera 100, the zoom frame is moved in response to the movement instruction (directional instruction), and the focus guide is not moved from its currently displayed position. That is, the movements performed based on the directional instructions in steps S609, S610, S613, S614, and S616 are only those of the zoom frame, and the focus guide remains unchanged in position (fixed to the center of the LV image in the area where the focus guide is displayed).

The processing procedure about movement control on items, such as the zoom frame and the focus guide, in a case where a directional instruction is input using the MC 82 or the directional pad 74 has been described.

Next, control in a case where an operation for restoring the display positions of items, such as the zoom frame and the focus guide, to their predetermined positions is performed will be described. The system control unit 50 displays the items, such as the zoom frame and the focus guide, at the predetermined positions in response to a predetermined operation (pressing of the MC 82 or the set button 75). In a case where a dual-lens image is being displayed, the system control unit 50 displays the items at the center of either the right area or the left area where the items are displayed before the predetermined operation in response to the predetermined operation. On the other hand, in a case where a dual-lens image is not being displayed, the system control unit 50 displays the items at the center of the screen in response to the predetermined operation. Thus, the display positions of the items can be appropriately controlled based on determination of whether the displayed image is a dual-lens image.

In step S617, the system control unit 50 determines whether either the center of the MC 82 is pressed (instead of the up, down, left, or right movement operation) or the set button 75 is pressed. In a case where the center of the MC 82 or the set button 75 is pressed (YES in step S617), the processing proceeds to step S618. In a case where neither the center of the MC 82 nor the set button 75 is pressed (NO in step S617), the processing proceeds to step S801 of FIG. 8A. The pressing of the center of the MC 82 or the set button 75 in this step can be determined as a center movement instruction to move the currently displayed zoom frame to the center of the LV image in the area where the zoom frame is displayed (center return).

In step S618, like step S411, the system control unit 50 obtains the type of lens unit attached via the communication terminals 6 and 10, and determines whether the attached lens unit is a dual-lens unit. In a case where the attached lens unit is a dual-lens unit (YES in step S618), the processing proceeds to step S623. In a case where the attached lens unit is not a dual-lens unit (NO in step S618), the processing proceeds to step S619.

In step S619, like step S421, the system control unit 50 determines whether the current focus mode of the digital camera 100 is set to the AF mode or the MF mode. In a case where the current focus mode is set to the AF mode (YES in step S619), the processing proceeds to step S620. In a case where the current focus mode is set to the MF mode (NO in step S619), the processing proceeds to step S621.

In step S620, the system control unit 50 moves the AF frame to the center of the LV image displayed on the display unit 28.

In step S621, the system control unit 50 moves the focus guide to the center of the LV image displayed on the display unit 28.

In step S622, the system control unit 50 moves the zoom frame to the center of the LV image displayed on the display unit 28 in synchronization with the position of the AF frame or the focus detection area of the focus guide.

In step S623, the system control unit 50 determines whether the zoom frame is displayed on the LV image in the right area. In other words, the system control unit 50 determines whether the zoom frame is displayed in the area 701R illustrated in FIG. 7B. In a case where the system control unit 50 determines that the zoom frame is displayed in the area 701R (YES in step S623), the processing proceeds to step S625. In a case where the system control unit 50 determines that the zoom frame is not displayed in the area 701R (NO in step S623), the processing proceeds to step S624.

In step S624, the system control unit 50 moves the display position of the zoom frame to the center of the LV image displayed in the left area. Specifically, the system control unit 50 moves the zoom frame to the center of the LV image displayed in the area 701L illustrated in FIG. 7B.

In step S625, the system control unit 50 moves the display position of the zoom frame to the center of the LV image displayed in the right area. Specifically, the system control unit 50 moves the zoom frame to the center of the LV image displayed in the area 701R illustrated in FIG. 7B.

The processing procedure of the control in the case where an operation for restoring the display positions of items, such as the zoom frame and the focus guide, to their predetermined positions is performed has been described.

Next, zoom processing and zoom ratio change processing to be performed when the zoom button 78 is pressed will be described.

Figure 8A:
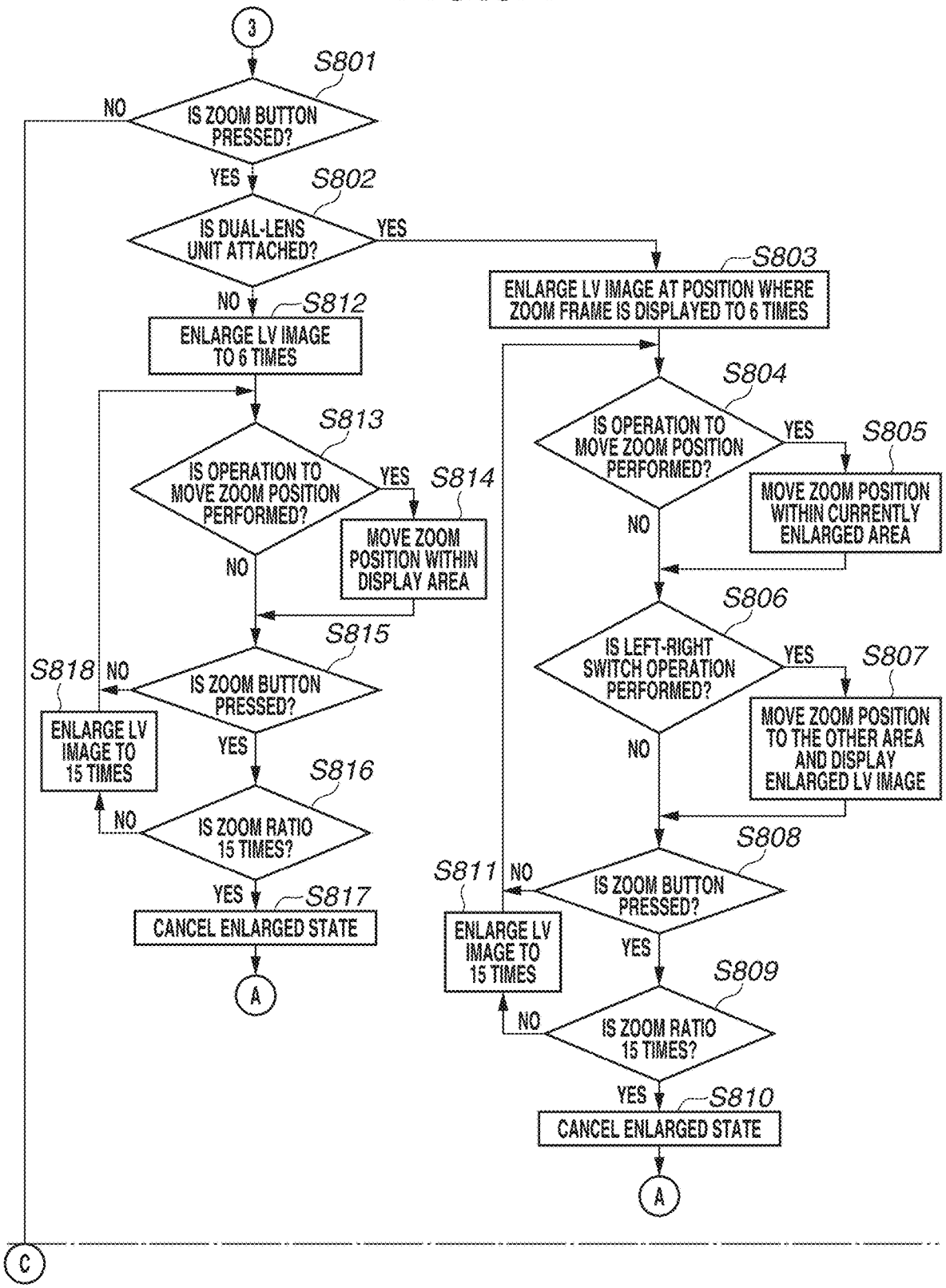
FIGS. 8A and 8B are a flowchart illustrating zoom processing and imaging operations by the digital camera according to the exemplary embodiment.
Figure 8B:
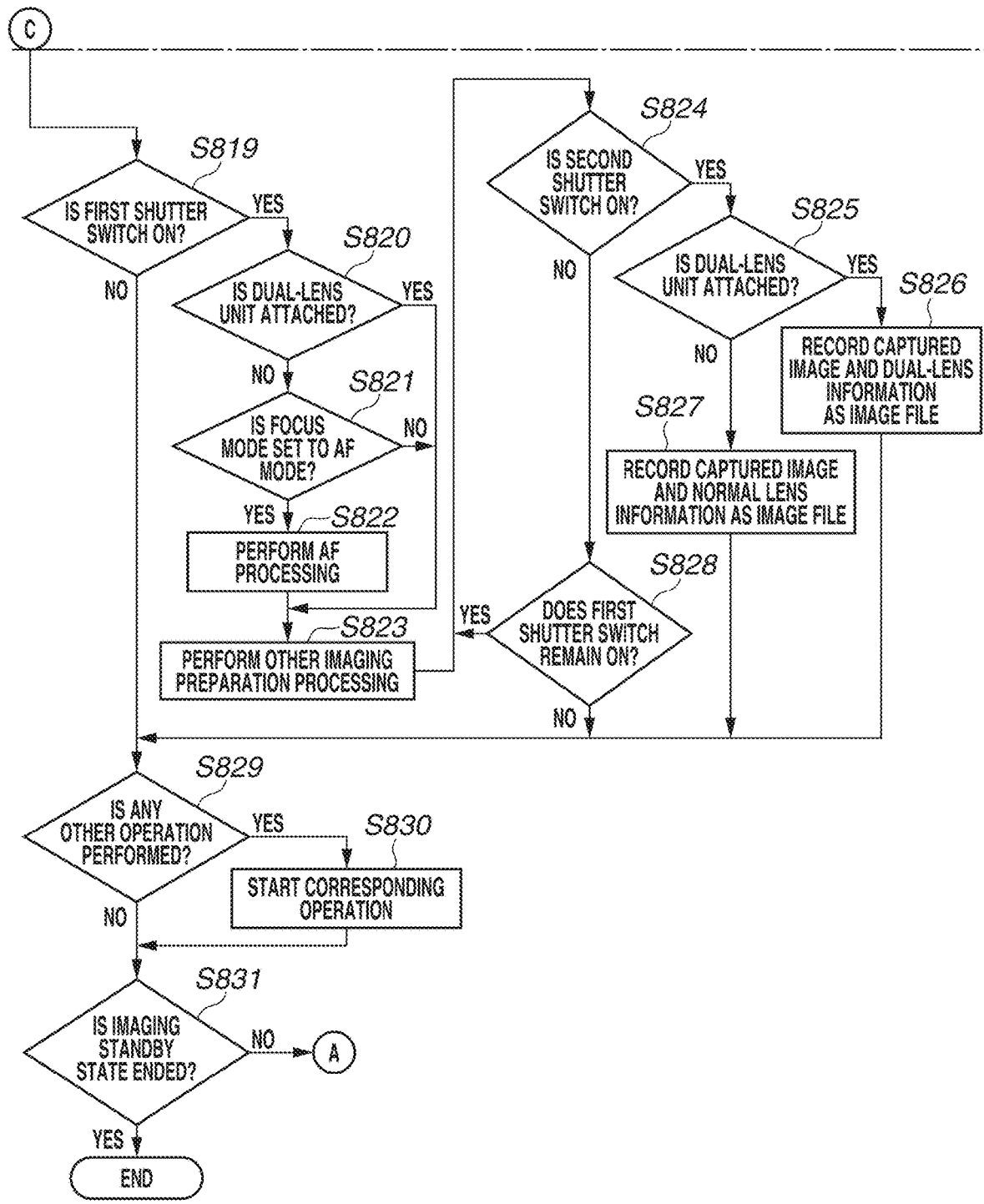

FIGS. 8A and 8B are a control flowchart about an operation for enlarging an LV image displayed on the display unit 28 and an imaging operation according to the present exemplary embodiment. Display examples of the display unit 28 when the control flowchart of FIGS. 8A and 8B is executed will be described with reference to FIGS. 9A to 9F. Details of the display examples illustrated in FIGS. 9A to 9F will be described below after the description of the control flowchart of FIGS. 8A and 8B.

In step S801, the system control unit 50 determines whether the zoom button 78 is pressed. In a case where the zoom button 78 is pressed (YES in step S801), the processing proceeds to step S802. In a case where the zoom button 78 is not pressed (NO in step S801), the processing proceeds to step S819. In the present exemplary embodiment, a zoom instruction is issued by a pressing operation performed on the zoom button 78 that is a physical member configured to be pressed down. However, a zoom instruction can also be issued by a pinch-out operation performed on the touch panel 70a, and an enlarged display can be cancelled by a pinch-in operation performed on the touch panel 70a.

In step S802, like step S411, the system control unit 50 obtains the type of lens unit attached via the communication terminals 6 and 10, and determines whether the attached lens unit is a dual-lens unit. In a case where the system control unit 50 determines that the attached lens unit is a dual-lens unit (YES in step S802), the processing proceeds to step S803. In a case where the system control unit 50 determines that the attached lens unit is not a dual-lens unit (NO in step S802), the processing proceeds to step S812.

Figure 9A:
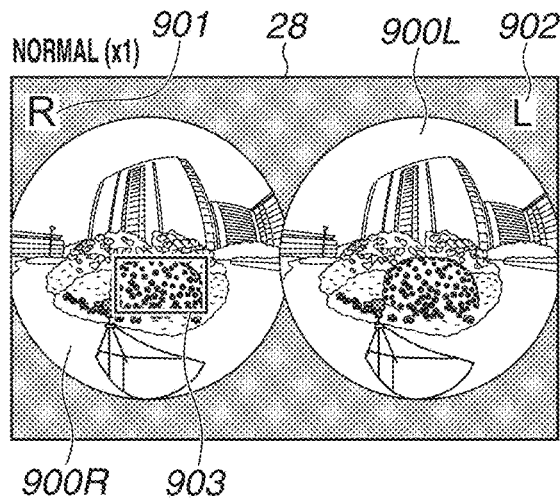
FIGS. 9A to 9F are diagrams illustrating zoom operations by the digital camera on which the dual-lens unit is attached, according to the exemplary embodiment.
Figure 9B:
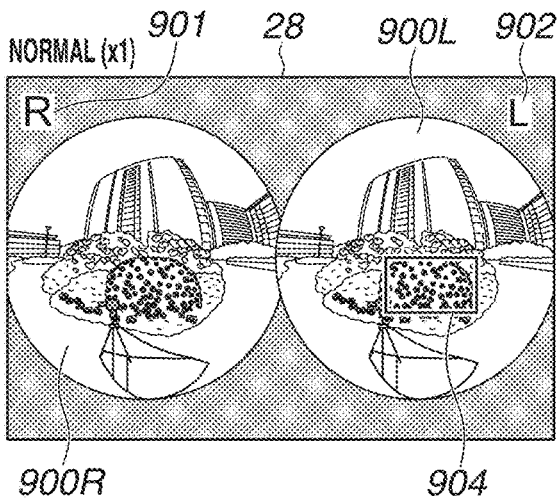
Figure 9C:
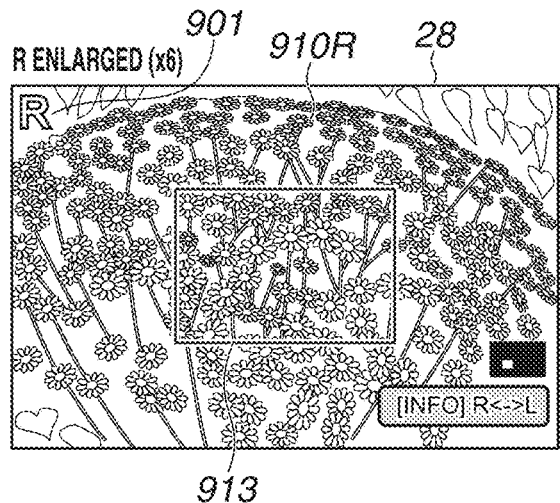
Figure 9D:
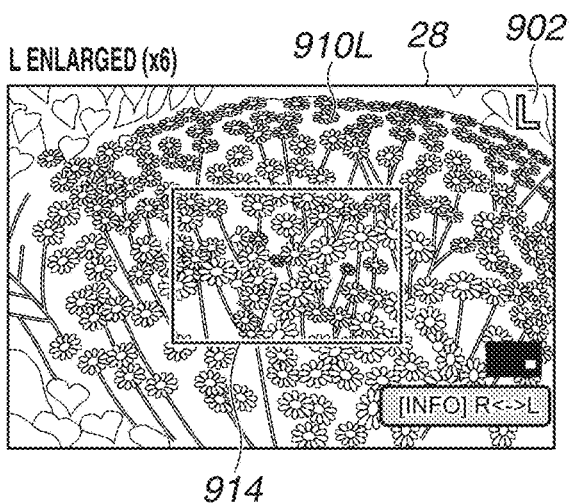

In step S803, the system control unit 50 enlarges the LV image at the position where the zoom frame is displayed to six times, and displays the enlarged LV image on the display unit 28. The size of the zoom frame displayed before the execution of the zoom processing is set in advance so that the enlarged image is entirely displayed on the display unit 28 when the zoom processing is performed with the zoom ratio of six times. The zoom ratio of six times in this process is determined based on a state where the LV image displayed on the display unit 28 is not enlarged (×1 zoom). FIGS. 9C and 9D illustrate enlarged display examples in this process.

In step S804, the system control unit 50 determines whether an operation to move a zoom position (enlarged area) is performed. In a case where the operation to move the zoom position is performed (YES in step S804), the processing proceeds to step S805. In a case where the operation to move the zoom position is not performed (NO in step S804), the processing proceeds to step S806. The operation to move the zoom position is performed by a directional instruction issued using the MC 82 or the directional pad 74 as described with reference to the control flowchart of FIGS. 6A and 6B. The operation can also be performed by an operation performed on the touch panel 70a.

In step S805, the system control unit 50 moves the zoom position within the currently enlarged one of the left and right of two display areas of the LV images displayed on the display unit 28, based on the operation for moving the zoom position in step S804. In other words, even in a case where the target area of the zoom processing touches the line 705 in either one of the left and right areas and a moving operation to bring the center of the zoom frame closer to the line 705 is performed, the system control unit 50 determines the moving operation to be invalid and does not move the zoom position.

As described in steps S607 to S614, since the user can visually observe the zoom frame displayed on the display unit 28 and the movement of the zoom frame in a state where the LV images is ×1 zoom, the user does not lose track of the zoom frame even in a control where the zoom frame moves from the displayed area to the other. By contrast, the zoom position is moved from one area to the other when an enlarged image is displayed, the user has difficulty in intuitively understanding which position the enlarged image is displaying.

A description will be given by taking an example case where the user wants to observe the left end of the LV image in the right area (the left side of the zoom frame touching the line 705) in more detail. In a case where the user is observing an enlarged display of the left-end part of the LV image in the right area, and if an operation to move the zoom frame is unintentionally performed by the user and the part to be enlarged and displayed is switched to the right-end part of the LV image in the left area, the user can get confused. Thus, in the state where the enlarged image is displayed, the system control unit 50 does not move the zoom position across the left and right areas in a case where the user issues an instruction to move the zoom position and the zoom position is at the end of the LV image.

In step S806, the system control unit 50 determines whether a left-right switch operation is performed. In a case where the left-right switch operation is performed (YES in step S806), the processing proceeds to step S807. In a case where the left-right switch operation is not performed (NO in step S806), the processing proceeds to step S808. The left-right switch operation refers to an operation for switching from one of the left and right of the two laterally arranged images to the other. Specifically, the left-right switch operation refers to pressing of a button having a left-right switch function (for example, an info button (not illustrated)).

In step S807, the system control unit 50 moves the zoom position from the area where the zoom position is set before the pressing of the button having the left-right switch function to the other area, and provides an enlarged display. In this process, the zoom position is moved in such a manner that the relative position of the zoom position in the area where the zoom position is set before the pressing of the button having the left-right switch function is maintained after the movement to the other area. For example, in a case where the LV image in the right area is being enlarged, the system control unit 50 calculates a distance from the center of the LV image in the right area to the zoom position. In response to the left-right switch operation performed by the user, the system control unit 50 applies the calculated distance from the center of the LV image to the zoom position to a distance from the center of the LV image in the other area (here, left area) to determine a zoom position and displays the enlarged image on the display unit 28.

In such control, the user who wants to check the same positions of both the LV images displayed in the left and right areas can easily switch between the left and right LV images with fewer operations. This reduces checking time for imaging.

In step S808, the system control unit 50 determines whether the zoom button 78 is pressed.

In a case where the zoom button 78 is pressed (YES in step S808), the processing proceeds to step S809. In a case where the zoom button 78 is not pressed (NO in step S808), the processing proceeds to step S804.

In step S809, the system control unit 50 refers to the system memory 52, and determines whether the zoom ratio of the LV image displayed on the display unit 28 is 15 times. In a case where the zoom ratio is 15 times (YES in step S809), the processing proceeds to step S810. In a case where the zoom ratio is not 15 times (NO in step S809), the processing proceeds to step S811.

In step S810, the system control unit 50 cancels the enlarged state of the LV image, and displays the not-enlarged (×1 zoom) LV images on the display unit 28. FIGS. 9A and 9B illustrate display examples here.

Figure 9E:
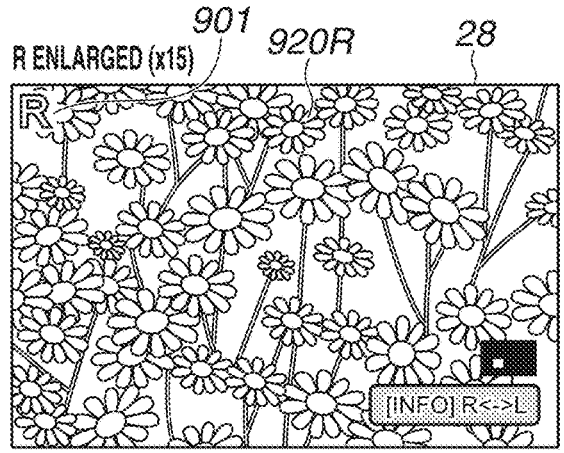
Figure 9F:
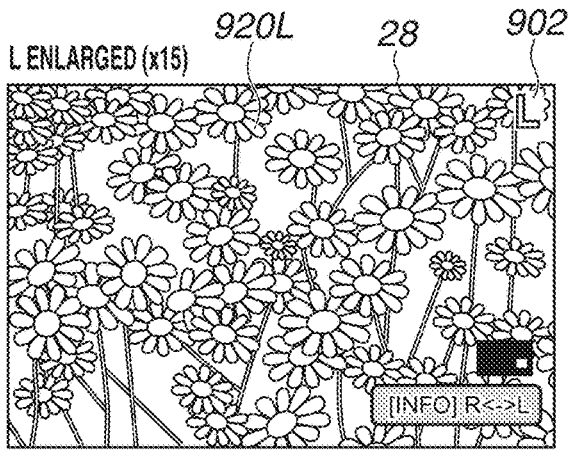

In step S811, the system control unit 50 enlarges the LV image at the display position of the zoom frame superimposed on the LV image to a zoom ratio of 15 times, and displays the enlarged image. The zoom ratio of 15 times in this process is determined based on the state where the LV image displayed on the display unit 28 is not enlarged (×1 zoom). FIGS. 9E and 9F illustrate display examples here.

In step S812, the system control unit 50 enlarges the LV image at the display position of the zoom frame superimposed on the LV image to a zoom ratio of six times, and displays the enlarged image on the display unit 28. The zoom ratio of six times in this process is determined based on the state where the LV image displayed on the display unit 28 is not enlarged (×1 zoom).

In step S813, like step S804, the system control unit 50 determines whether an operation to move the zoom position is performed. In a case where the operation to move the zoom position is performed (YES in step S813), the processing proceeds to step S814. In a case where the operation to move the zoom position is not performed (NO in step S813), the processing proceeds to step S815.

In step S814, the system control unit 50 moves the zoom position within the display area of the LV image based on the operation to move the zoom position. In this step, the lens unit attached to the digital camera 100 is a single-lens unit since the determination of step S802 is NO. In other words, since only one LV image is displayed on the display unit 28, the zoom position can be moved without factoring in the determination of whether the area is left or right as in step S805.

In step S815, like step S808, the system control unit 50 determines whether the zoom button 78 is pressed. In a case where the zoom button 78 is pressed (YES in step S815), the processing proceeds to step S816. In a case where the zoom button 78 is not pressed (NO in step S815), the processing returns to step S813.

In step S816, the system control unit 50 refers to the system memory 52, and determines whether the current zoom ratio of the LV image is 15 times. In a case where the current zoom ratio is 15 times (YES in step S816), the processing proceeds to step S817. In a case where the current zoom ratio is not 15 times (NO in step S816), the processing proceeds to step S818.

In step S817, like step S810, the system control unit 50 cancels the enlarged state of the LV image, and displays the not-enlarged (×1 zoom) LV image on the display unit 28.

In step S818, the system control unit 50 enlarges the LV image at the display position of the zoom frame superimposed on the LV image to a zoom ratio of 15 times, and displays the enlarged image on the display unit 28. The zoom ratio of 15 times in this process is determined based on the state where the LV image displayed on the display unit 28 is not enlarged (×1 zoom).

In step S819, the system control unit 50 determines whether the first shutter switch 62 is on. In a case where the first shutter switch 62 is on (YES in step S819), the processing proceeds to step S820. In a case where the first shutter switch 62 is not on (NO in step S819), the processing proceeds to step S829. That the first shutter switch 62 being on refers to the state where the shutter button 61 is half-pressed as described above. In other words, it can be determined that the user is about to perform image capturing.

In step S820, like step S411, the system control unit 50 obtains the type of lens unit attached via the communication terminals 6 and 10, and determines whether the attached lens unit is a dual-lens unit. In a case where the system control unit 50 determines that the attached lens unit is a dual-lens unit (YES in step S820), the processing proceeds to step S823. In a case where the system control unit 50 determines that the attached lens unit is not a dual-lens unit (NO in step S820), the processing proceeds to step S821.

In step S821, the system control unit 50 determines whether the focus mode is set to the AF mode. In a case where the focus mode is set to the AF mode (YES in step S821), the processing proceeds to step S822. In a case where the focus mode is not set to the AF mode (the focus mode is set to the MF mode) (NO in step S821), the processing proceeds to step S823. The AF mode and the MF mode are switched via a setting menu screen or by using a switch provided outside the lens unit 150.

In step S822, the system control unit 50 performs AF processing based on the position of the AF frame.

In step S823, the system control unit 50 performs other imaging preparation processing including AE and AWB processing.

In step S824, the system control unit 50 determines whether the second shutter switch 64 is on. In a case where the second shutter switch 64 is on, i.e., the shutter button 61 is fully pressed (YES in step S824), the processing proceeds to step S825. In a case where the second shutter switch 64 is not on (NO in step S824), the processing proceeds to step S828.

In step S825, like step S411, the system control unit 50 obtains the type of lens unit attached via the communication terminals 6 and 10, and determines whether the attached lens unit is a dual-lens unit. In a case where the system control unit 50 determines that the attached lens unit is a dual-lens unit (YES in step S825), the processing proceeds to step S826. In a case where the system control unit 50 determines that the attached lens unit is not a dual-lens unit (NO in step S825), the processing proceeds to step S827.

In step S826, the system control unit 50 performs a series of imaging processes up to recording of an image captured by the dual-lens unit and dual-lens information on the recording medium 200 as an image file.

In step S827, the system control unit 50 performs a series of imaging processes up to recording of a captured image and normal (single) lens information on the recording medium 200 as an image file.

In step S828, the system control unit 50 determines whether the first shutter switch 62 remains on. In a case where the system control unit 50 determines that the first shutter switch 62 remains on (YES in step S828), the processing returns to step S824. If not (NO in step S828), the processing proceeds to step S829.

In step S829, the system control unit 50 determines whether any operation other than the foregoing operation is detected. In a case where any other operation is detected (YES in step S829), the processing proceeds to step S830. In a case where any other operation is not detected (NO in step S829), the processing proceeds to step S831. Specifically, the system control unit 50 determines whether the menu button 81 or the playback button 79 is pressed.

In step S830, the system control unit 50 starts to perform processing corresponding to the detected operation. In a case where the menu button 81 is pressed, the system control unit 50 displays the menu screen for settings. In a case where the playback button 79 is pressed, the system control unit 50 displays an image stored in the recording medium 200.

In step S831, the system control unit 50 determines whether the imaging standby state is ended. For example, in a case where the imaging standby state is ended by power-off (YES in step S831), the control flowchart of FIGS. 8A and 8B ends. In a case where the system control unit 50 determines that the imaging standby state is not ended (NO in step S831), the processing returns to step S401 of FIG. 4.

The LV images displayed on the display unit 28 when a zoom instruction is issued by the user will be described with reference to FIGS. 9A to 9F.

FIG. 9A illustrates a display example where the enlargement ratio is ×1 (i.e., without zoom) and the zoom frame 903 is superimposed on the left area, i.e., an LV image (LV 900R) captured via the right-eye optical system 301R. The display unit 28 displays the LV 900R captured via the right-eye optical system 301R and an LV 900L captured via the left-eye optical system 301L. As described above, the LV 900R displayed in the left area is an LV image captured via the right-eye optical system 301R, and the LV 900L displayed in the right area is an LV image captured via the left-eye optical system 301L.

Display items 901 and 902 are displayed to notify the user of the lateral inversion. The display item 901 displays "R", which indicates the right. The display item 902 displays "L", which indicates the left. In a case where the zoom button 78 is pressed once in the state illustrated in FIG. 9A, the state transitions to that illustrated in FIG. 9C. In a case where the left-right switch button (not illustrated) is pressed once, the state transitions to that illustrated in FIG. 9B, where the zoom frame 903 superimposed on the LV 900R is moved to a relatively similar position in the LV 900L as a zoom frame 904.

FIG. 9B illustrates a display example where the zoom ratio is ×1 (i.e., without zoom) and the zoom frame 904 is superimposed on the right area, i.e., the LV image (LV 900L) captured by the left-eye optical system 301L. In FIG. 9B, a zoom frame 904 is superimposed on the LV 900L. In a case where the zoom button 78 is pressed once in the state illustrated FIG. 9B, the state transitions to that illustrated in FIG. 9D. In a case where the left-right switch button is pressed once, the state transitions to that illustrated in FIG. 9A, where the zoom frame 904 superimposed on the LV 900L is moved to a relatively similar position in the LV 900R as the zoom frame 903.

FIG. 9C illustrates a display example where the LV 900R is enlarged to the zoom ratio of six times. The display item 901 indicating which optical system the enlarged image displayed on the display unit 28 is captured by is superimposed on an LV 910R that is the enlarged LV image. Additionally, the zoom frame 913 is superimposed on the six times enlarged image.

FIG. 9D illustrates a display example where the LV 900L is enlarged to a zoom ratio of six times. The display item 902 indicating which optical system the enlarged image displayed on the display unit 28 is captured by is superimposed on an LV 910L that is the enlarged LV image. Additionally, the zoom frame 914 is superimposed on the six times enlarged image.

FIG. 9E illustrates a display example where the LV 900R is enlarged to a zoom ratio of 15 times and displayed as an LV 920R.

The display item 901 indicating an LV image captured by the right-eye optical system 301R is superimposed on the LV 920R that is the 15 times enlarged image and displayed on the display unit 28.

FIG. 9F illustrates a display example where the LV 900L is enlarged to a zoom ratio of 15 times and displayed as an LV 920L.

The display item 902 indicating an LV image captured by the left-eye optical system 301L is superimposed on the LV 920L that is the 15 times enlarged image and displayed on the display unit 28.

In other words, FIGS. 9A and 9B illustrate the LV images, displayed on the display unit 28, of a case where the zoom ratio is ×1 (i.e., without zoom), FIGS. 9C and 9D illustrate the LV images, displayed on the display unit 28, of a case where the zoom ratio is ×6, and FIGS. 9E and 9F illustrate the LV images, displayed on the display unit 28, of a case where the zoom ratio is ×15.

The zoom ratio of the LV image(s) displayed on the display unit 28 is changed in order of ×1, ×6, ×5, and ×1 each time the zoom button 78 is pressed. In a case where the left-right switch button is pressed and the zoom ratio is ×1, the display area is switched so that the zoom frame is superimposed on the other LV image. Specifically, in a case where the zoom frame is superimposed on the LV 900R displayed in the left area, the display area is switched so that the zoom frame is superimposed on the LV 900L displayed in the right area. In a case where the zoom ratio is other than ×1, the zoom position is switched to the area of the other LV image at a relatively similar position. Here, the zoom ratio is maintained unchanged.

In the above descriptions, the operations for issuing instructions to switch the display mode, instructions to move the zoom frame or zoom position, and zoom instructions are performed by using the operation buttons having the dedicated functions. Alternatively, the functions may be assigned to a button or buttons to which various functions can be freely assigned.

As described above, when an image is captured with a lens unit including two optical systems (dual-lens unit) attached, the zoom frame indicating the zoom position of the LV images is prevented from being displayed over the border between the two LV images during imaging. The two LV images captured via the two optical systems are displayed on the display unit 28 side by side, and the zoom frame is not displayed over or moved across the border between the two LV images. This can prevent an image including both the two LV images from being enlarged and displayed when the user issues a zoom instruction, whereby the user's confusion can be reduced.

In a case where the two LV images are displayed at ×1 zoom (not enlarged), in response to a movement instruction further to the right issued from the user in a state where the zoom frame reaches the right end of the LV image displayed in the left area, the zoom frame is moved to skip the border between the two LV images.

More specifically, the zoom frame is controlled to move from the right end of the LV image in the left area to the left end of the LV image in the right image. This can prevent the area indicated by the zoom frame from including both the two LV images, and can smoothly move the zoom frame between the two LV images.

On the other hand, in a case where either one of the two LV images is enlarged, the zoom frame is not moved in the instructed direction even if a movement instruction for the zoom position is further performed on the zoom frame reached the border-side end of the currently enlarged image (the right end of a case where the left area is enlarged or the left end of a case where the right area is enlarged). In other words, in situations where the user has difficulty in visually observing the current zoom position, the zoom position is not moved beyond the area (border between the LV images). This can prevent unintended crossing of the border between the LV images, and can reduce the user's confusion.

In a case where a lens unit including two optical systems (dual-lens unit) is attached, the focus guide and the zoom frame are not in synchronization with each other (not synchronized). When two LV images are displayed like a case where a dual-lens unit is attached, and details of the entire LV images are difficult to observe without enlarging the LV images, the user is likely to want to enlarge the LV images and check the LV images in more detail regardless of the in-focus position. Thus, the focus guide and the zoom frame are not synchronized with each other so that the user can zoom in on not only the position of the focus guide including the frame indicating the focus detection position but desired positions as well. On the other hand, in a case where a normal lens unit (single-lens unit) is attached, the focus guide or AF frame and the zoom frame are basically in synchronization with each other so that the position of the zoom frame also moves as the focus guide or the AF frame is moved. Since, in a case where a single-lens unit is attached, only one LV image is displayed on the display unit 28 in a larger size than when two LV images are displayed, the user can easily observe details of the LV image in ×1 zoom compared to the LV image of a case where a dual-lens unit is attached.

The foregoing various controls that are performed by the system control unit 50 may be performed by a single piece of hardware. A plurality of pieces of hardware (such as a plurality of processors or circuits) may share the processing to perform entire control of the entire digital camera 100.

While the exemplary embodiment of the present invention has been described in detail, the present invention is not limited to this specific exemplary embodiment, and various variations within a range not departing from the gist of the invention are also included in the present invention. Moreover, the foregoing exemplary embodiment is just one exemplary embodiment of the present invention, and various exemplary embodiments can be combined as appropriate.

The foregoing exemplary embodiment has been described by using an example where the exemplary embodiment is applied to the digital camera 100. However, this example is not restrictive, and an exemplary embodiment of the present invention is applicable to any electronic equipment that can display an image captured using two optical systems. More specifically, an exemplary embodiment of the present invention can be applied to a personal computer, a personal digital assistant (PDA), a mobile phone terminal, a portable image viewer, a printer apparatus including a display, a digital photo frame, a music player, a game machine, an electronic book reader, home appliances, an on-vehicle apparatus, and a medical device.

An exemplary embodiment of the present invention is not limited to the imaging apparatus main body but also applicable to electronic equipment that communicates with an imaging apparatus (such as a network camera) via wired or wireless communication and remotely control the imaging apparatus. Examples of the apparatus that remotely controls an imaging apparatus include a smartphone, a tablet personal computer (PC), and a desktop PC. The imaging apparatus can be remotely controlled by the electronic equipment notifying the imaging apparatus of commands for various operations and settings based on operations performed on the control apparatus or processing performed by the electronic equipment. The electronic equipment may be able to receive LV images captured by the imaging apparatus via wired or wireless communication and display the LV images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, the user can visually observe a zoom position in a state where a plurality of LV images obtained via a plurality of optical systems is displayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capturing apparatus capable of attaching/detaching a lens unit, comprising:
   a processor; and
   a memory storing a program which, when executed by the processor, causes the image capturing apparatus to:
   obtain a third image in which a first image captured via a first optical system and a second image captured via a second optical system are arranged side by side, wherein the second image has parallax with the first image, when a dual-lens unit including the first optical system and the second optical system is attached;
   obtain a fourth image captured via a single optical system, when a single lens unit including the single optical system is attached;
   perform display control to display an item indicating a focus detection area on a screen of a display unit;
   receive a position designation for designating a position of the item on the screen, based on detecting a user operation; and
   perform display control to move and display the item on the screen based on the position designation,
   wherein the item is displayed and superimposed at a predetermined position of either one of the first image and the second image on the screen upon receiving the position designation when the dual-lens unit is attached, and the item is displayed and superimposed at a position corresponding to the position designation on the screen upon receiving the position designation when the single lens unit is attached.

2. The apparatus according to claim 1, wherein the item indicates a degree of in-focus
at the focus detection area.

3. The apparatus according to claim 1, wherein the predetermined position is a center
position.

4. The apparatus according to claim 1, wherein the program when executed by the
   processor further causes the image capturing apparatus to
      perform enlargement processing on a target area;
      perform display control to display a zoom frame indicating the target area on
   the screen;
      receive a zoom position designation for designating a position of the zoom frame on the screen, based on detecting a user operation; and
      perform display control to move and display the zoom frame on the screen
      based on the zoom position designation;

wherein the item is displayed without moving in a manner linked with the zoom frame when the dual-lens unit is attached, and the item is moved and displayed in a manner linked with the zoom frame when the single lens unit is attached.

5. The apparatus according to claim 1, when executed by the processor further causes
the image capturing apparatus to
perform display control to display a magic window indicating an area to be initially displayed on an external display device, when the dual-lens unit is attached.

6. The apparatus according to claim 5, wherein the magic window is displayed and
superimposed on both the first image and the second image on the screen.

7. A method for controlling an image capturing apparatus capable of attaching/detaching a lens unit, comprising:
obtaining a third image in which a first image captured via a first optical system and a second image captured via a second optical system are arranged side by side, wherein the second image has parallax with the first image, when a dual-lens unit including the first optical system and the second optical system is attached;
obtaining a fourth image captured via a single optical system, when a single lens unit including the single optical system is attached;
performing display control to display an item indicating a focus detection area on a screen of a display unit;
receiving a position designation for designating a position of the item on the screen, based on detecting a user operation; and
performing display control to move and display the item on the screen based on the position designation,
wherein the item is displayed and superimposed at a predetermined position of either one of the first image and the second image on the screen upon receiving the position designation when the dual-lens unit is attached, and the item is displayed and superimposed at a position corresponding to the position designation on the screen upon receiving the position designation when the single lens unit is attached.

8. The method according to claim 7, wherein the item indicates a degree of in-focus at
the focus detection area.

9. The method according to claim 7, wherein the predetermined position is a center
position.

10. The method according to claim 7, further comprising:
performing enlargement processing on a target area;
performing display control to display a zoom frame indicating the target area
on the screen;
receiving a zoom position designation for designating a position of the zoom
frame on the screen, based on detecting a user operation; and
performing display control to move and display the zoom frame on the screen
based on the zoom position designation;
wherein the item is displayed without moving in a manner linked with the zoom frame when the dual-lens unit is attached, and the item is moved and displayed in a manner linked with the zoom frame when the single lens unit is attached.

11. The method according to claim 7, when executed by the processor further causes
the image capturing apparatus to
perform display control to display a magic window indicating an area to be initially displayed on an external display device, when the dual-lens unit is attached.

12. The method according to claim 11, wherein the magic window is displayed and
superimposed on both the first image and the second image on the screen.

13. A non-transitory computer-readable recording medium storing a program for
causing the image capturing apparatus to execute the method according to claim 7.

14. The non-transitory computer-readable recording medium according to claim 13, wherein the item indicates a degree of in-focus at the focus detection area.

15. The non-transitory computer-readable recording medium according to claim 13, wherein the predetermined position is a center position.

16. The non-transitory computer-readable recording medium according to claim 13, further comprising:
performing enlargement processing on a target area;
performing display control to display a zoom frame indicating the target area on the screen;
receiving a zoom position designation for designating a position of the zoom frame on the screen, based on detecting a user operation; and
performing display control to move and display the zoom frame on the screen
based on the zoom position designation;
wherein the item is displayed without moving in a manner linked with the zoom frame when the dual-lens unit is attached, and the item is moved and displayed in a manner linked with the zoom frame when the single lens unit is attached.

17. The non-transitory computer-readable recording medium according to claim 13, when executed by the processor further causes the image capturing apparatus to
perform display control to display a magic window indicating an area to be initially displayed on an external display device, when the dual-lens unit is attached.

18. The non-transitory computer-readable recording medium according to claim 17, wherein the magic window is displayed and superimposed on both the first image and the second image on the screen.

* * * * *